United States Patent [19]

Richmond et al.

[11] Patent Number: 5,729,101
[45] Date of Patent: Mar. 17, 1998

[54] GATE OPERATOR AND METHOD USING AUTOMATIC LIMIT ADJUSTMENT

[76] Inventors: Moscow K. Richmond, 120 Glascow Ave., Inglewood, Calif. 90301; Thomas R. Richmond, 2320 N. Park Blvd., Santa Ana, Calif. 92706; Patrick S. Kochie, 6337 Cory, Simi Valley, Calif. 93063

[21] Appl. No.: 212,711

[22] Filed: Mar. 11, 1994

[51] Int. Cl.⁶ ................................................ H02P 1/22
[52] U.S. Cl. ........................ 318/282; 318/266; 318/467; 49/28; 49/139; 160/311
[58] Field of Search ..................... 318/432, 466, 318/266, 286, 282, 468, 467, 560, 469, 476; 160/310–311, 291, 133, 189, 191, 265, 293.1; 49/28, 26, 139, 138, 147, 140

[56] References Cited

U.S. PATENT DOCUMENTS

| | | | |
|---|---|---|---|
| 3,891,909 | 6/1975 | Newson | 318/469 |
| 4,234,833 | 11/1980 | Barrett | 318/468 |
| 4,338,553 | 7/1982 | Scott, Jr. | 318/466 |
| 4,369,399 | 1/1983 | Lee et al. | 318/467 |
| 4,429,264 | 1/1984 | Richmond et al. | 318/466 |
| 4,916,860 | 4/1990 | Richmond et al. | 49/139 |
| 4,929,877 | 5/1990 | Clark et al. | 318/468 |
| 5,136,809 | 8/1992 | Richmond et al. | 49/28 |
| 5,230,179 | 7/1993 | Richmond et al. | 49/28 |
| 5,350,986 | 9/1994 | Long et al. | 318/432 |
| 5,353,859 | 10/1994 | Ottahfur et al. | 160/310 |

*Primary Examiner*—John W. Cabeca

[57] ABSTRACT

A gate operator for moving a gate between two fixed end positions such as a gate opened position and a gate closed position and minimizing the possibility of impact with a fixed structure at either of these end positions. The operator relies upon measuring the number of electrical pulses or so-called counts representative of a distance between the two fixed end positions. The gate operator includes a controller in which the number of counts are measured between movement from an open position to a closed position, or a closed position to an open position, and the count is automatically readjusted to eliminate any hard contact of the gate at a fixed closed or open position. In one of the important embodiments of the invention, the gate operator utilizes a controlled coasting system. In this case, the gate is driven from one end position toward the other end position by a motor and the motor is de-energized by a preselected number of counts at a coasting position in advance of the end position toward which the gate is moving. If the gate still strikes the end position or overdrives the end position, the operator automatically compensates so that the gate automatically reaches the end position to which the gate is moving and automatically stops.

43 Claims, 19 Drawing Sheets

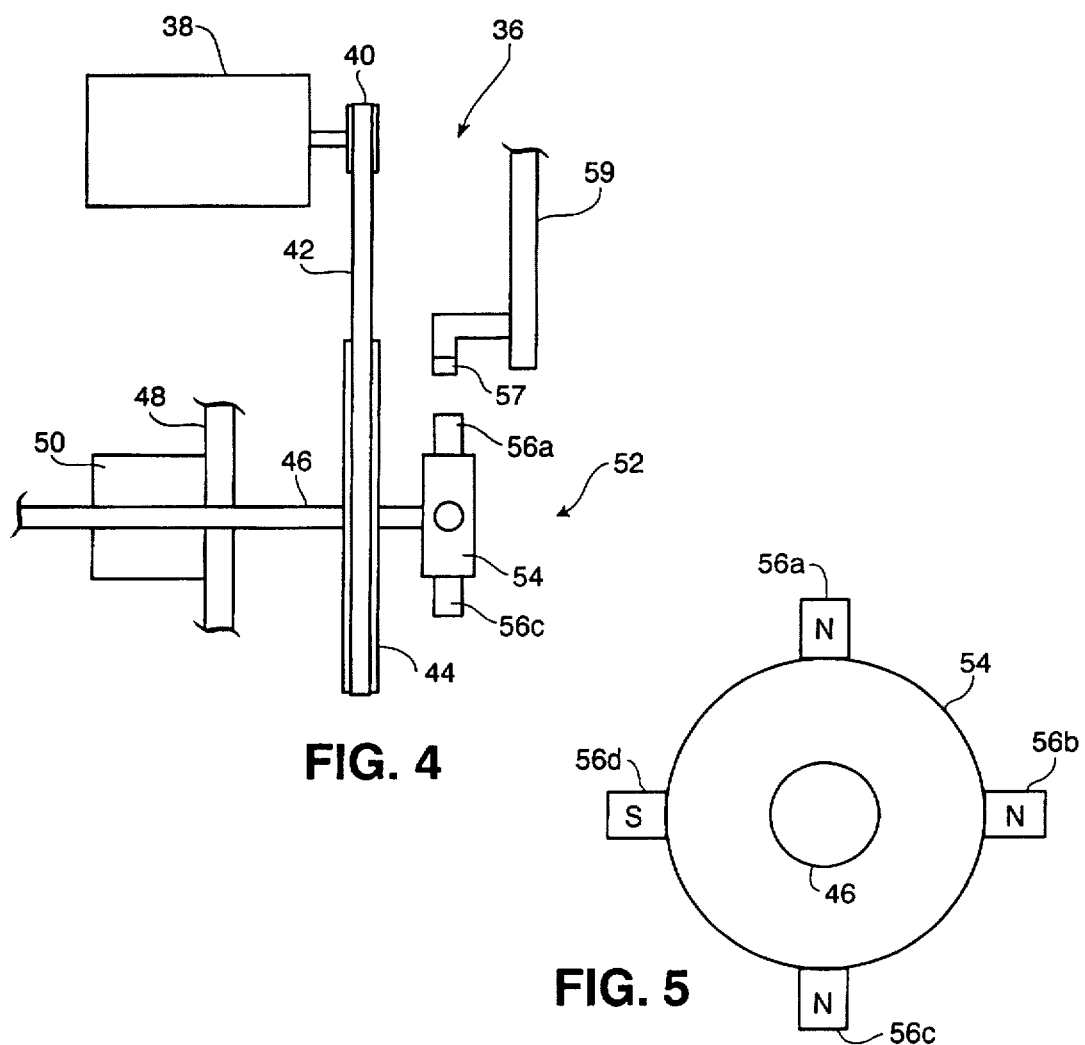
FIG. 4
FIG. 5
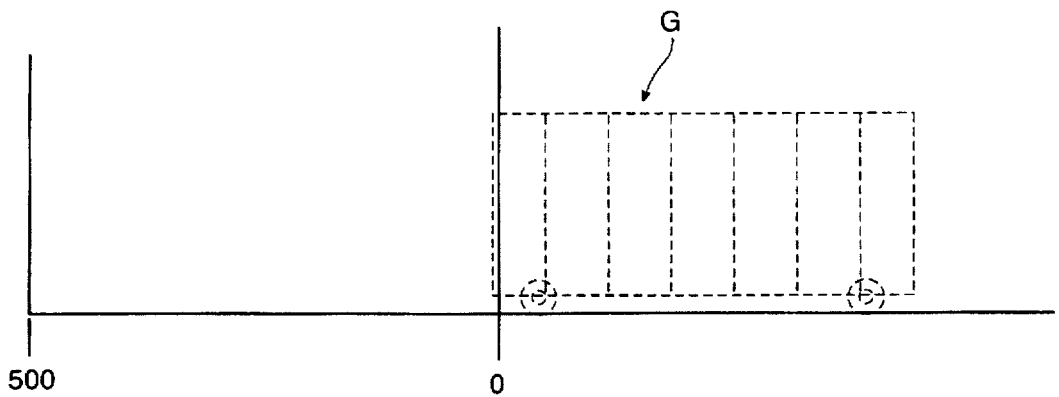
FIG. 6

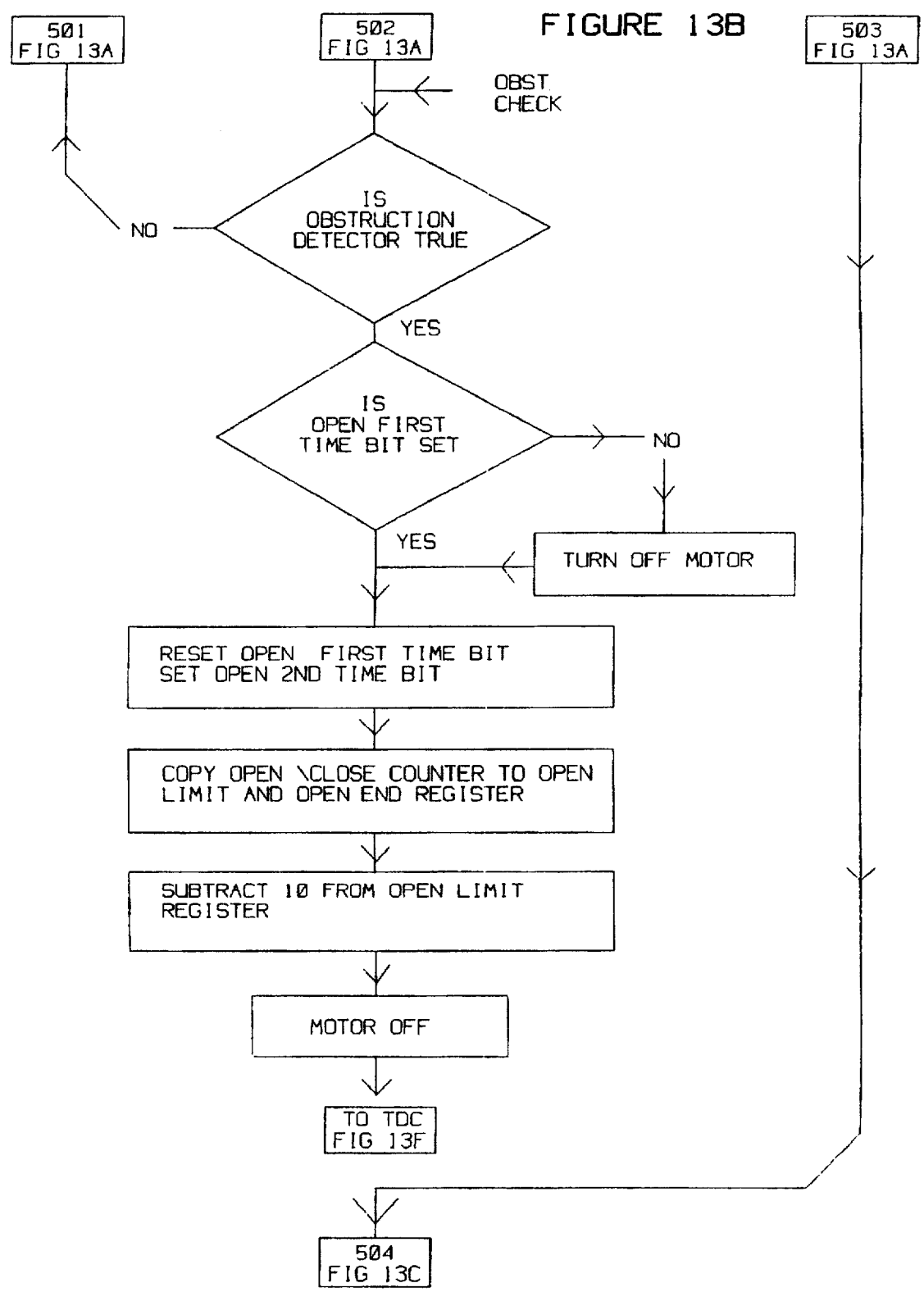

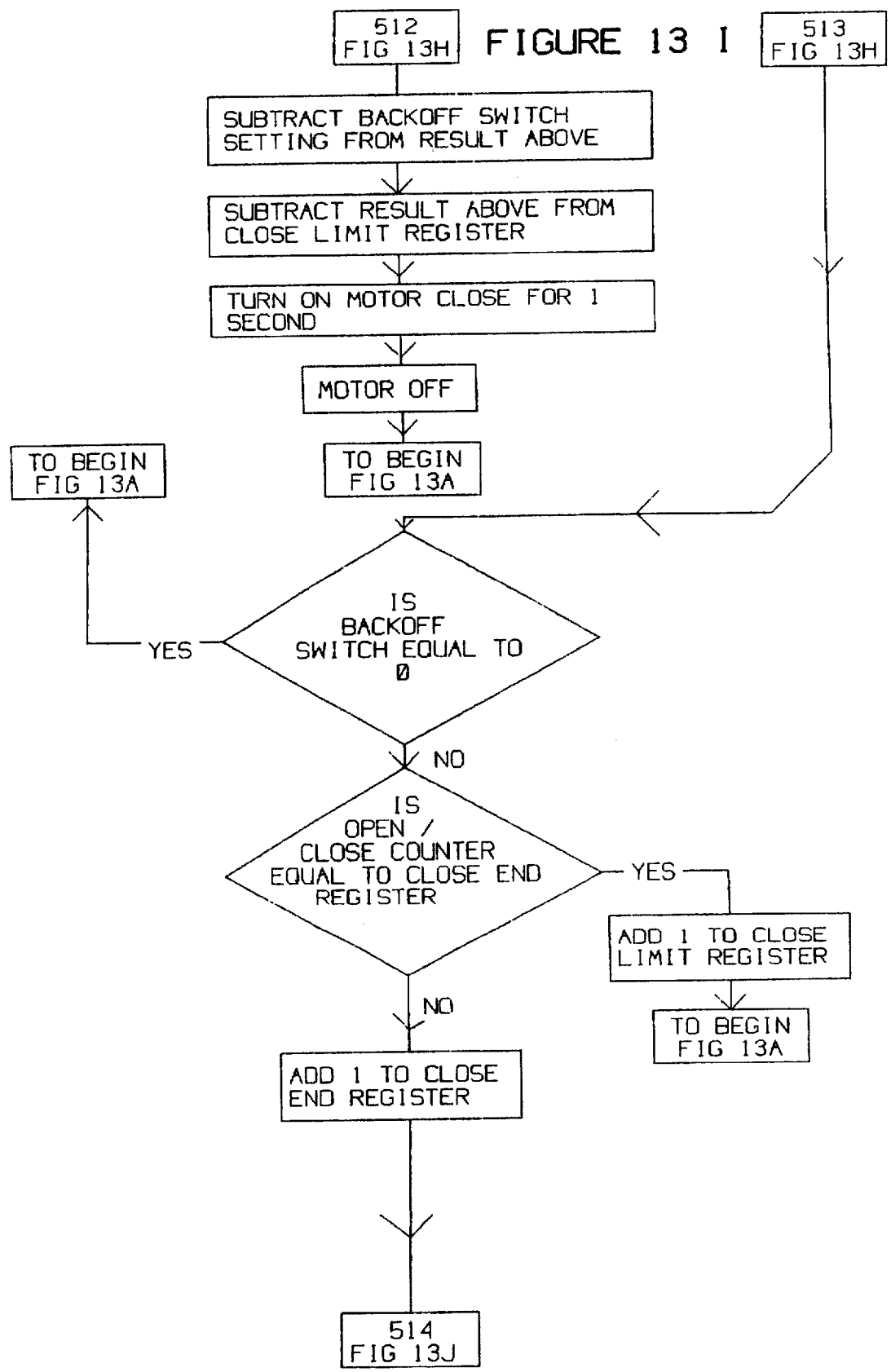

GATE OPERATOR AND METHOD USING AUTOMATIC LIMIT ADJUSTMENT

BACKGROUND OF THE INVENTION

1. Field of the Invention

This invention relates in general to certain new and useful improvements in an apparatus and method for controlling the opening and closing movement of gates, and more particularly, to an apparatus and method for automatically controlling the movement of gates on a highly efficient basis and which relies upon automatically adding or subtracting counts representing distance of movement from a measured count between a fully opened and closed, or between a fully closed and opened position to eliminate hard contact of the gate with a fixed structure. Even more particularly, the apparatus and the method of the invention rely upon de-energizing a motor causing gate movement and allowing the gate to coast to a closed position or an opened position to thereby eliminate hard contact of the gate with a fixed structure.

2. Brief Description of the Prior Art

Over the years, a variety of types and styles of gates have been developed to provide security for such areas as parking structures and entrances and exits to residential and industrial properties. These gates may take the form of sliding gates which move in or on a track, or swinging gates which are rotatably hinged to a fixed structure. Where large passageways are involved, gates may be provided in pairs which operate from opposite sides of the openings.

Many control systems have been developed to provide automatic control for the opening and closing of gates. These control systems include an electric motor operatively connected to the gate to control its movement. Typically, the motor is controlled by a switch in the vicinity of the gate which can only be operated by authorized personnel. For example, the switch may be in the form of a key switch which can only be operated by use of a conventional key or by a card key.

Various prior art control systems also employ means for mechanically sensing when the gate is in its fully opened or fully closed position. These sensing means are typically in the form of limit switches which are used to de-energize the motor when the gate has reached its end position of travel. The limit switches must be individually adjusted for each gate installation to ensure proper alignment with the opened and closed positions of the gate. In addition, because of the mechanical nature of the limit switches, they tend to wear and change in their adjustment, resulting in improper gate operation.

In addition to detecting the opened and closed positions of the gate, safety considerations require means for detecting if the gate has encountered an obstruction in its travel. For example, such obstructions might be caused by a vehicle or pedestrian in the path of the gate while it is being operated. When an obstruction is detected, gate motion must be stopped to avoid damage to either the gate or the obstruction or injury to people.

In addition to the above, each of the prior art locking mechanisms also uses a complex gear structure for purposes of driving the gate between the opened and closed positions. While these gear boxes are effective, they are noisy and consume a substantial amount of the power generated by the electric motor. Moreover, it is virtually impossible to push a gate against the action of the gear box in the event of a power failure.

There have also been gate operators, sometime referred to as gate opening and closing apparatus, which utilize sensors, such as optical sensors, for measuring the extent of movement of the gate between the opened and closed positions and thereafter controlling the gate during movements for the measured distance. In this way, the gate opening and closing apparatus will effectively measure the distance of the first movement of the gate and thereafter move the gate for that same distance during each subsequent opening and closing movement. One such opening and closing apparatus is more fully illustrated and described in U.S. Pat. No. 4,429,264, dated Jan. 31, 1984 by Moscow K. Richmond, for "System and Method For The Automatic Control Of Electrically Operated Gates."

In all gate operators, variations in gate movement will result as a function of wear, temperature change and like conditions. Thus, when a gate operator effectively measures a distance between an opened position and a closed position to subsequently move the gate for that measured distance, the measurement is effective only for so long as conditions remain static. However, wear in any of the mechanical construction in the drive mechanism will cause the gate to move a greater or lesser distance and changes in temperatures will cause bearings to exert more friction on rotating members, etc. This will inevitably alter the amount of driving force required to move a gate between two fixed positions. As a result, the gate will start to physically engage a wall or other fixed structure at one of those end positions.

This problem of wear is particularly pronounced in a new gate installation using a new gate operator. After the gate has been installed and used for a short time, it is almost necessary for the installer to revisit the site of the installation for again adjusting the gate.

U.S. Pat. No. 4,159,599, dated Jul. 3, 1979 by Moscow K. Richmond for "Gate Opening and Closing Assembly, discloses a gate which is slidable between opened and closed positions and which uses a method of measuring gate movement. U.S. Pat. No. 4,313,281, dated Feb. 2, 1982 by Moscow K. Richmond for "Gate Opening and Closing Apparatus and Method" and U.S. Pat. No. 4,330,958 by Moscow K. Richmond, dated May 25, 1982 for "Gate Opening and Closing Assembly with Automatic Locking Means" also discloses gate operators which use systems for automatically measuring the distance a gate moves between an open and closed gate positions.

There has also been a significant problem of "tailgating", that is, where an unauthorized individual attempts to enter a secured area immediately following one who authorizedly opens the gate and where the unauthorized individual enters before the gate has closed. Typically, a gate opens for a predetermined time interval and which is typically longer than the time needed for a vehicle to enter a secured area. As a result, someone who is unauthorized in the secured area can also drive his or her vehicle into the secured area prior to the closing of the gate. This is particularly pronounced in apartment buildings and commercial building areas where large gate openings are employed as, for example, 20-foot openings. Most vehicles require only a 10 to 12 foot opening, although the larger opening is used for commercial trucks and the like. In this case, since the gate must travel a longer distance to close, there is often sufficient time for an unauthorized individual to drive his or her vehicle into the secured area.

Many gate operators also presently employ safety loop sensors. These sensors are located so as to detect the presence of a vehicle and maintain the gate in an opened condition until there is no vehicle in the proximity of the gate. This type of sensor thereby avoids the problem of the gate banging into an automotive vehicle before the vehicle has left the access opening. While this type of safety loop sensor arrangement is necessary to avoid damage to the vehicles, it also creates the security problem of allowing one without authorized access into the secured area.

There has been a need for a gate operator and an associated method which enables a gate operator to automatically calibrate itself and allow the gate to be moved between opened and closed positions without banging into a fixed structure at either of these positions. There has also been a need for a gate operator which precludes one from unauthorizedly obtaining access into a secured area immediately after the gate has been authorizedly opened and before it reaches its closed position.

OBJECTS OF THE INVENTION

It is, therefore, one of the primary objects of the present invention to provide a gate operator in which a gate is driven between two fixed end positions while measuring the distance and subsequently opening or closing the gate by automatically driving that gate from one position to the other, and automatically adding to or subtracting from that distance to achieve a proper opening or closing without hard contact with a fixed structure.

It is another object of the present invention to provide a gate operator of the type stated in which a gate is driven between two fixed end positions while measuring the distance and by automatically driving the gate from one position to the other, but stopping the driving movement in advance of an end position and allowing the gate to coast to that end position.

It is another important object of the present invention to provide a gate operator of the type stated in which an error count is determined when a gate is moved between two fixed end positions with a portion of that movement constituting a coasting movement and in which the distance of the coasting movement is adjusted in response to the error count.

It is a further object of the present invention to provide a gate operator of the type stated which enables detection of direction of movement of the gate between fixed end positions.

It is an object of the present invention to provide a gate operator which eliminates the problems of a gate banging into a fixed structure at an end position of movement of that gate and which thereby avoids damage not only to the fixed structure but to the gate operator itself.

It is also an object of the present invention to provide a gate operator of the type stated which reliable in operation, highly effective in precluding a gate from banging into a fixed structure and which can also be constructed at a relatively low cost.

It is another salient object of the present invention to provide a gate operator of the type stated in which the operator automatically adjusts the distance of driving movement of the gate from one end position to another with compensation for driving the gate an increased amount of time if the gate did not fully reach the end position and for reducing the amount of driving time if the gate is slammed into an end position.

It is still another object of the present invention to provide a method of opening and closing a gate which relies upon partially driving the gate between two fixed end positions and allowing for a controlled coasting movement of the gate towards one of those end positions.

It is still a further object of the present invention to provide a method of opening and closing a gate and which provides for automatic limit adjustment so that the gate always reaches an end position without slamming into an end position.

It is yet another salient object of the present invention to provide a gate operator which precludes unauthorized individuals from entering through an access opening following authorized access and before the gate has again returned to a closed position.

With the above and other objects in view, our invention resides in the novel features of form, construction, arrangement, and combination of parts presently described and pointed out in the claims.

BRIEF SUMMARY OF THE INVENTION

In a broad aspect, the present invention relates to a gate operator for moving a gate between two fixed end positions which may constitute, for example, a gate opened position and a gate closed position, while minimizing the possibility of hard impact with a fixed structure at those end positions. In one embodiment, the present invention broadly relies upon driving a gate between a gate opened and a gate closed position and automatically compensating for conditions which would affect gate movement to thereby minimize a hard contact with a fixed structure at either of the end positions.

The gate operator of the invention is provided with a driving means for driving a gate under power between the opened and closed positions. The gate operator also comprises an obstruction detect circuit which automatically causes a gate to move to the position from which it was moving if the gate contacts a relatively immovable structure during gate movement. In this case, a fixed structure at either of the end positions would also function as a gate obstruction.

A control means is provided for measuring a count representative of fixed end position movement of the gate; that is, the amount of movement between one fixed end position to the other fixed end position. The control means also measures a count representative of each subsequent movement of the gate to the same end position and automatically adds a control count to increase the driving movement and hence, the driving distance, if the gate stopped short of that fixed end position. This control means will also subtract counts from the fixed end position movement in order to reduce the driving movement and hence, the driving distance on subsequent gate movements if the gate still contacts a fixed structure at the end position.

The control means, in a preferred embodiment of the invention, includes a memory means which receives counts representative of the fixed end position movement, as well as control counts to increase or reduce driving movement. A counter measures the counts during the movement of the gate toward one end position and the movement of the gate toward the other end position and provides these counts to the memory means.

A switch means is also associated with the control means to adjust the amount of the control counts. In this way, an operator can manually intervene to increase or decrease the number of control counts which are added to or subtracted from the counts representative of fixed end position movement.

In a more preferred embodiment, the memory means comprises an open end register to store the count representative of gate movement to an opened position and a closed end register to store the count representative of gate movement to a gate closed position. The memory means also incorporates an open limit register to store an open control count for use in modifying the count representative of movement of the gate to the opened position, as well as a close limit register to store a closed control count for use in modifying the count representative of the movement of the gate to the closed position.

In another aspect, the present invention broadly relies upon stopping a driving movement of a gate in advance of one of the end positions and allowing the gate to coast to that end position with a coasting movement. If the gate does not reach the end position, the control count is generated and this control count is taken into consideration on subsequent driving movements of the gate. The control means stops the driving power, during subsequent movements of the gate, when the gate is moved from one end position toward the other, but in advance of that end position. The driving power is stopped in advance of that end position by a distance known as a coasting distance and directly related to a coasting count. The gate is thereby allowed to coast to the end position toward which it is moving.

The control means operates in conjunction with a detecting means to determine if the gate actually stopped at the fixed end positions toward which it was moving. If the gate stopped coasting before it reached that end position, the control means causes the gate to be driven for a greater distance on a subsequent movement between the fixed end positions, so that there would be a lesser coasting distance. If the gate advanced to the fixed end position toward which it was moving, then the control means will cause the gate to be driven for a shorter distance on a subsequent movement with a longer coasting distance.

The gate operator of the present invention is capable of continuously recalibrating itself so that it can detect movement between the fixed end positions and determine if the gate is, in effect, impacting a fixed structure at the end position and adjusting subsequent movements thereof.

The gate operator of the present invention utilizes a measured count, or fixed end position count, representing the movement of the gate between one fixed end position to the other fixed end position. Thereafter, a predetermined coasting count is employed and introduced into the control means when the gate operator is installed. On subsequent movements, the gate operator will drive the gate by a distance equivalent to the measured count between the two fixed end positions, less the coasting count which has been predetermined, and that count is the driving count, directly related to a driving distance. When the gate is moved to the coasting position and the gate is no longer powered, it will coast to a fixed rest position and the count between the initiating of the coasting position and the fixed rest position constitutes an error count or a coasting count.

If the gate stops at the fixed rest position, on subsequent movements, the gate operator will move the gate for the amount of the measured fixed end position count, less the coasting count and will add the control count. If the gate stopped in advance of the fixed end position, the gate operator will automatically add control counts to the total thus calculated. If the gate still contacted the fixed end position with an impact, the gate operator will subtract a count from the total count.

The present invention utilizes the aforesaid memory in combination with a processor, such as a microprocessor, with the memory storing the counts which are measured. An arithmetic logic unit also is associated with the control unit in order to perform the necessary addition and subtraction operations for the counts which are measured. A detecting means is used for detecting counts generated by a movable member on the gate operator and the detecting means is preferably a magnetically operable detecting means.

The present invention generally utilizes the coasting system which has been previously described. However, it should be understood that the invention is operable without the coasting, due to the fact that the control means will automatically calibrate or compensate for movement of the gate when the gate stops short of a fixed end position or contacts that fixed end position with a hard impact. The coasting feature is preferred for use in the invention, due to the fact that it minimizes the amount of hard impact which would otherwise occur before the gate operator finally calibrated itself to avoid further hard impact of the gate. As a simple example, if a gate fixed end position count were 500 and on a subsequent movement, the gate stopped at 490, the control means would automatically add additional counts and there would, of course, be no hard impact. However, if the gate operator attempted to move the gate beyond a position of 500, there would be a hard impact with a fixed structure and hence, the gate operator would start automatically reducing the number of counts in the fixed end position count by a predetermined number of control counts. Thus, if the gate operator was driving the gate for an excess of ten counts and on subsequent movements, one control count was eliminated for each gate movement between an opened and closed position and the gate still contacted the fixed end position, there would be ten hard impacts before complete correction without the coasting feature. Accordingly, the coasting feature is preferred.

The magnetically operable detecting means, often referred to as a "detecting means", comprises a plurality of magnetic elements which are fixed about a rotatable member forming part of the gate operator. The magnetic elements will rotate with respect to Hall sensors and thereby generate pulses or equivalent counts, as the rotatable member rotates. The rotatable member will rotate in direct proportion to the movement of the gate and hence, the pulses which are detected are equivalent to units of measurement of movement of the gate.

The gate operator generally is capable of moving a gate between a gate opened position and a gate closed position where it covers an access opening. The drive means, which may preferably be in the form of an electric motor, is provided for driving the gate between the gate opened and the gate closed positions. A connecting means is provided for connecting the motive means to the gate to cause a powered movement of the gate between the gate opened and gate closed positions. The connecting means may adopt the form of, for example, pulleys or sprockets, or the like mounted on the motive means and on the gate. A drive mechanism, such as a clutch structure, as hereinafter described in more detail, is interposed between the electric motor or other motive means and the gate.

The detecting means, as aforesaid, operates in conjunction with the control means, which is preferably a microprocessor operated controller. Thus, the detecting means will generate a count for rotations of a member in the gate operator equivalent to the distance of movement that is the initial driving movement, and for the error count. These counts will then be stored in the memory means and accessed by the controller for subsequent determinations. The control means and the motive means operate in conjunction with one another to detect an obstruction in the path of the movement of the gate. The control means will automatically cause the motive means to reverse the direction of the movement of the gate upon the detection of any such obstruction.

One of the unique advantages of the gate operator of the present invention is the fact that the limit settings for movement of the gate are automatically set with essentially no required adjustment by the installer. Previously, it was necessary for the installer to carefully monitor the installed gate for a period of time in order to adjust the gate movement to thereby avoid hard impact at a fixed end position. However, minor changes in the external conditions or even in the gate operator would affect those limit settings. Consequently, the gate was essentially was always in need of continual limited adjustment.

The invention utilizes back-off switches which adjust how far the gate stops from the physical end position. Every time that the gate opens and closes, the position of the gate is effectively checked against the back-off switch settings and the opened and closed position measurements to compensate for any changes in the driving movement of the gate.

The term "gate" is used in a generic sense to include doors and like structures and essentially constitutes any movable framework or structure which controls entrance or exist through an access opening to provide a passageway.

The term "fixed end position count", as used herein, will refer to the count or the number of pulses measured during movement of a gate between the two fixed end positions. The term "drive count" will refer to the number of counts or pulses used for driving a gate from one fixed end position to the coasting position, that is, the position where driving power to move the gate is ceased. The term "coasting count", as used herein, will refer to the number of counts or pulses which would be generated for movement of the gate from the coasting position to the full end position toward which the gate is moving. The term "control count" is a count which is generated by the control unit of the operator to add to the drive count (i.e. subtract from the coasting count), if the gate has stopped short of a fixed end position, or the count which is subtracted from the drive count (i.e., added to the drive count coasting), if the gate has contacted a fixed end position. The term "coasting position", as used herein, refers to the position during the movement of the gate between two fixed end positions where driving power is stopped and the gate is allowed to coast toward the end position to which it is moving.

The present invention also includes an anti-tailgating mechanism which is incorporated in the gate operator. In this case, the anti-tailgating feature may adopt either of two forms. In the first embodiment or form of the anti-tailgating feature, the gate is programmed only to open a limited distance. For example, if the gate is capable of opening 20 feet to allow commercial trucks and like vehicles to enter, the gate is also operated so that it will only open 10 feet for passenger vehicles and the like. In this way, the gate is only opened and moved to a closed position over a lesser closing distance and hence, a smaller closing time, which limits the possibility of someone attempting to unauthorizedly enter the secured area.

In this embodiment of the anti-tailgating mechanism, a pair of input switches are employed to operate the gate. These input switches may adopt a plurality of forms, as indicated previously. However, considering the use of manually actuable input switches, or RF operated switches, one type of input switch would be used for opening the gate the full distance of e.g. 20 feet, and another input switch would be used for opening the gate a lesser distance of e.g. 10 feet. In addition, other input switches could also be used to provide a pedestrian access so that the gate only opens a limited distance of e.g. 5 feet.

In a second embodiment of the anti-tailgating feature, the gate does not return to the opened position if an obstruction is detected. Proximity sensors will normally detect the presence of an automotive vehicle as an obstruction and thereby automatically cause the gate to fully open in a conventional prior art gate operator. In the present invention, and in the second embodiment of the anti-tailgating feature, the gate operator only stops the gate when an obstruction is detected but does not move the gate back to its original position. Thus, if an automotive vehicle is entering an access opening, and an obstruction detect is noted, movement of the gate back to the closed position will stop. However, the operator will not move back to the opened position which would thereby allow an unauthorized individual to enter the area. For this purpose, the sensors are employed on either side of the gate and are connected to the control unit. The control unit is properly arranged to automatically stop movement of the gate in the event of an obstruction detection.

This invention possesses many other advantages and has other purposes which may be made more clearly apparent form a consideration of the forms in which it may be embodied. These forms are shown in the drawings forming a part of and accompanying the present specification. They will now be described in detail for the purposes of illustrating the general principles of the invention, but is to be understood that such detailed description is not to be taken in a limiting sense.

BRIEF DESCRIPTION OF THE DRAWINGS

Figure 1:
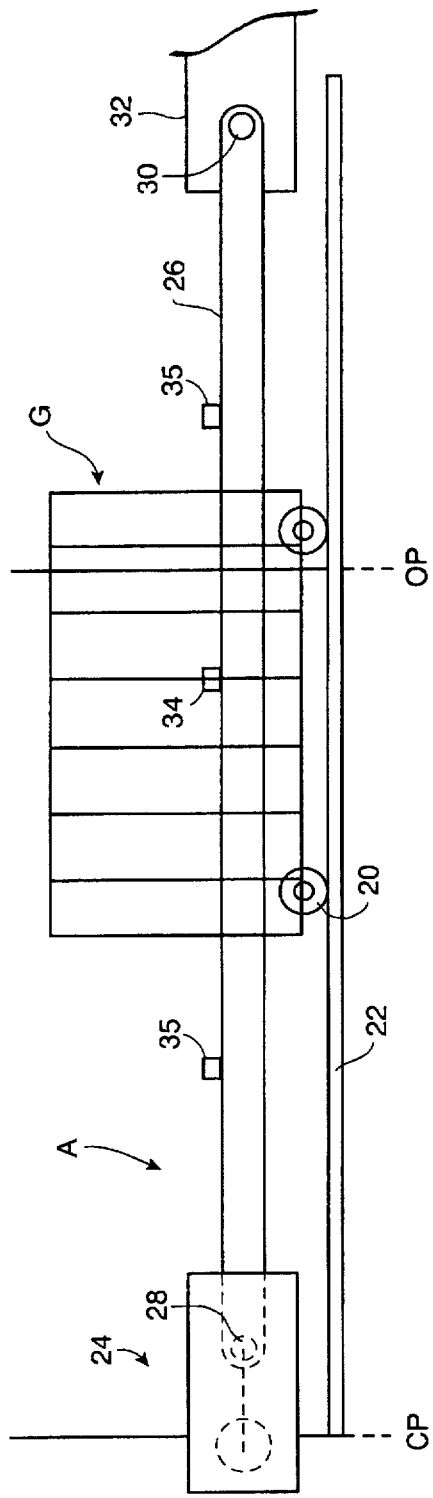
Figure 3:
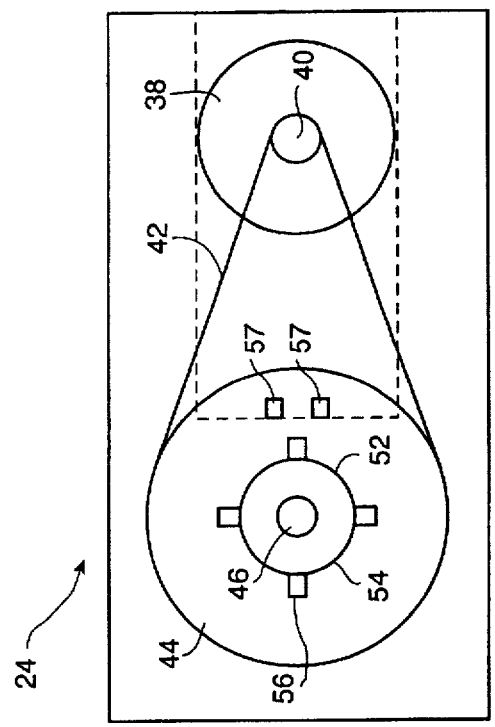
Figure 2:
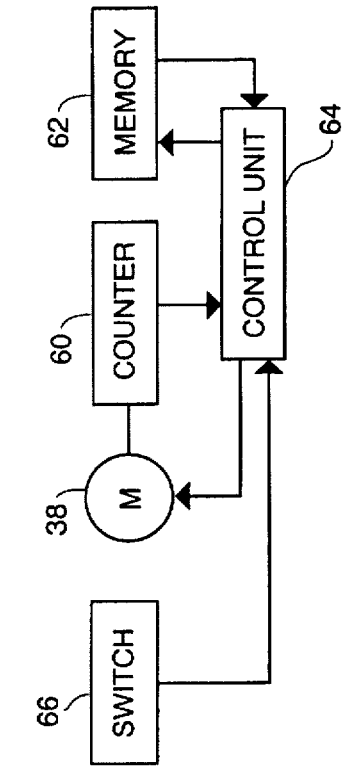
Figure 7:
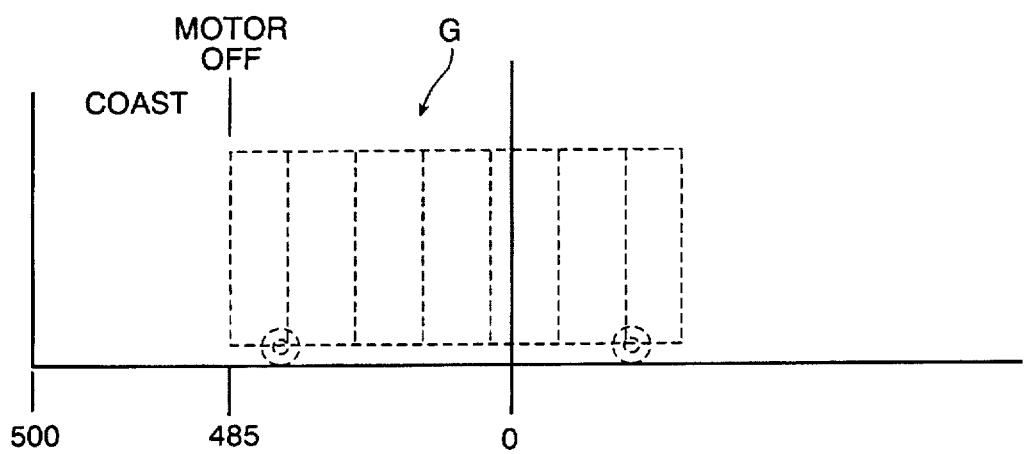
Figure 8:
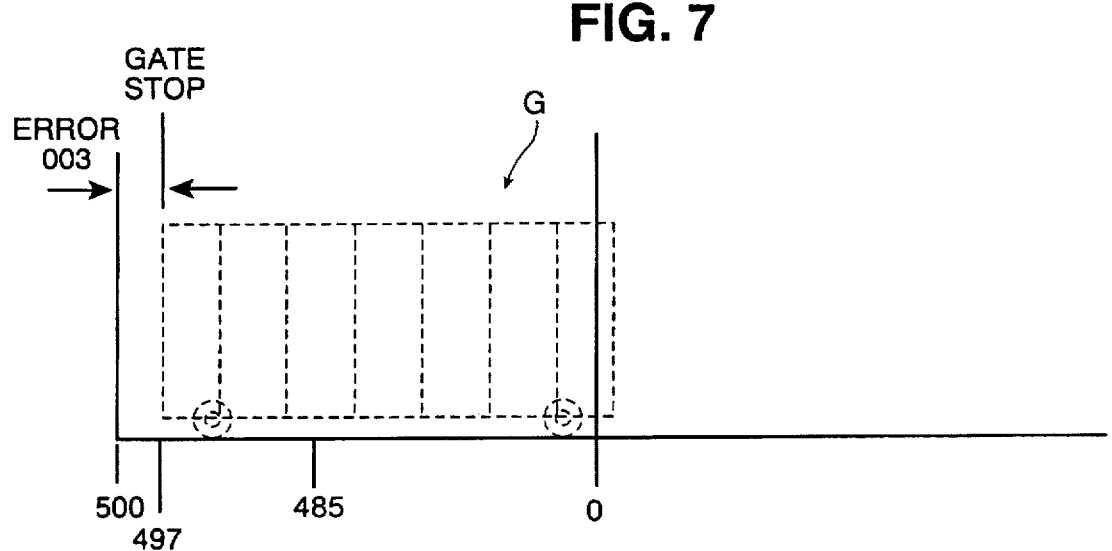
Figure 9:
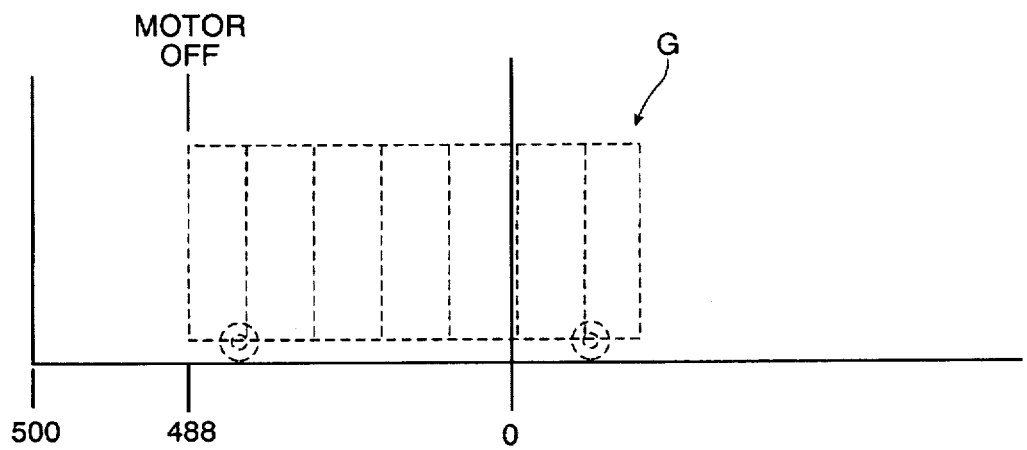
Figure 11:
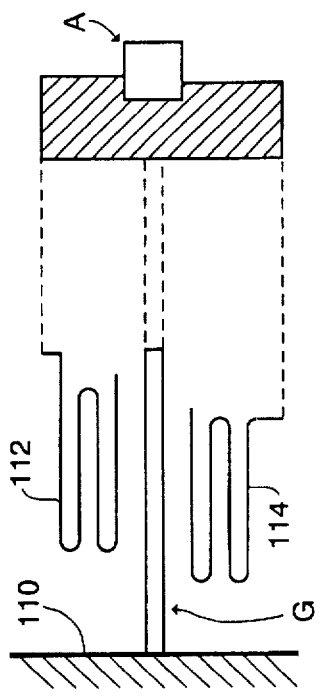
Figure 10:
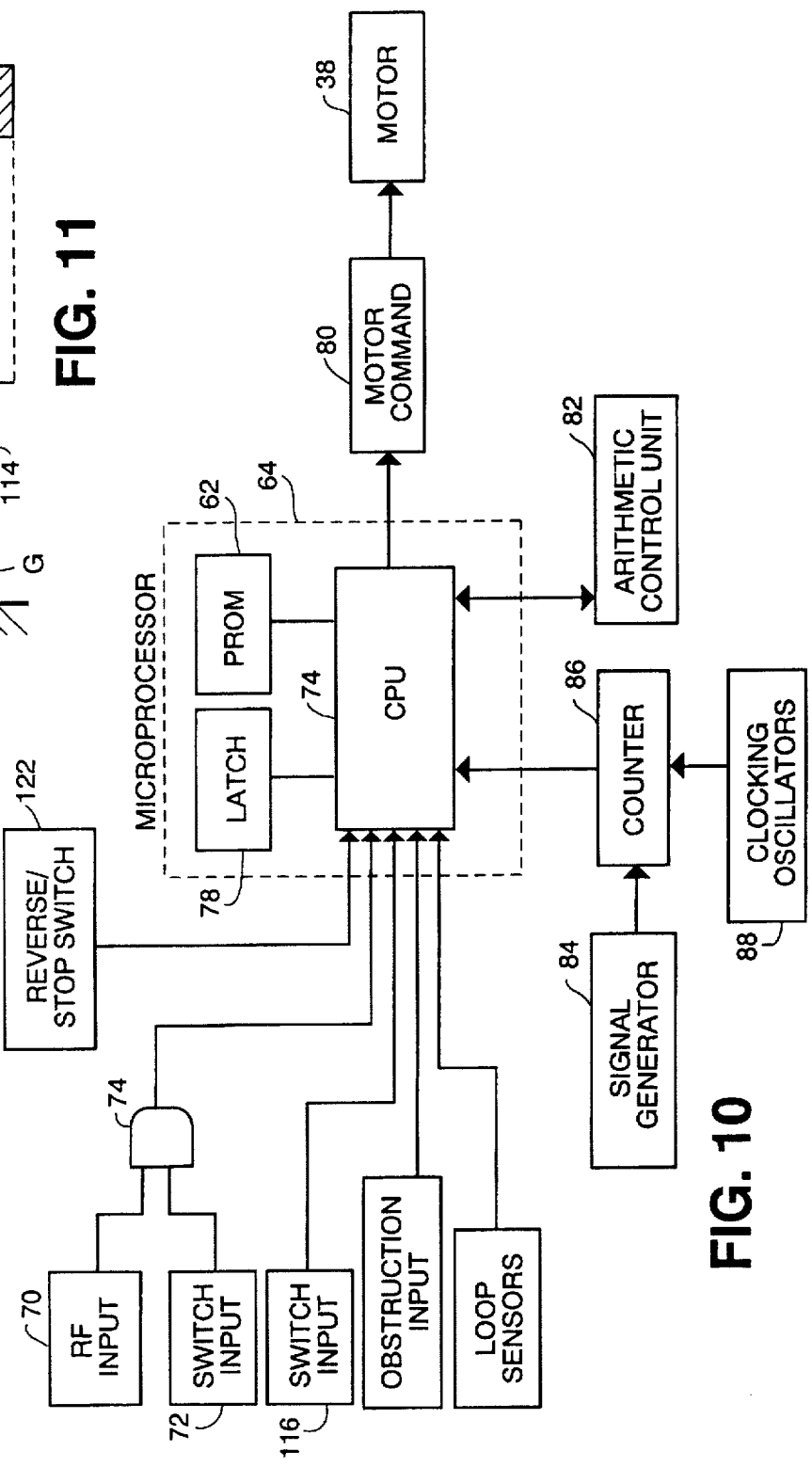
Figure 12:
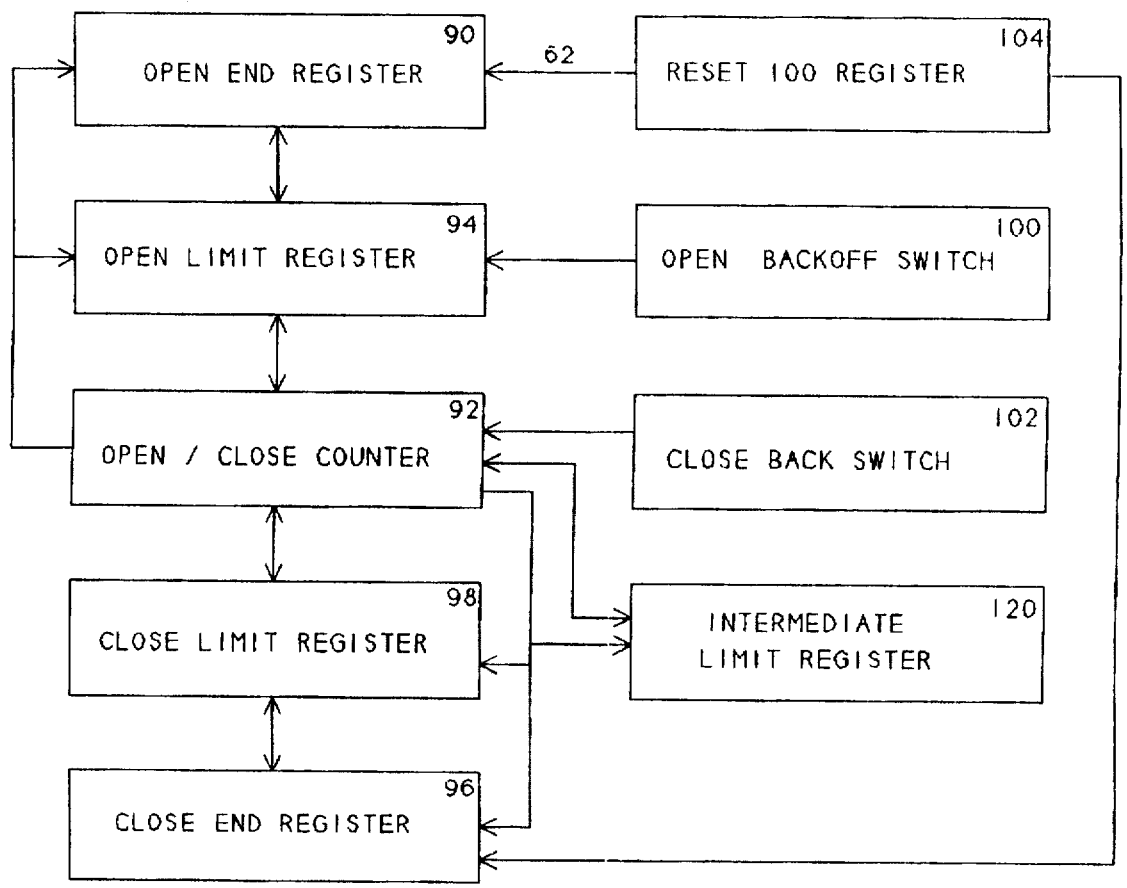
Figure 13A:
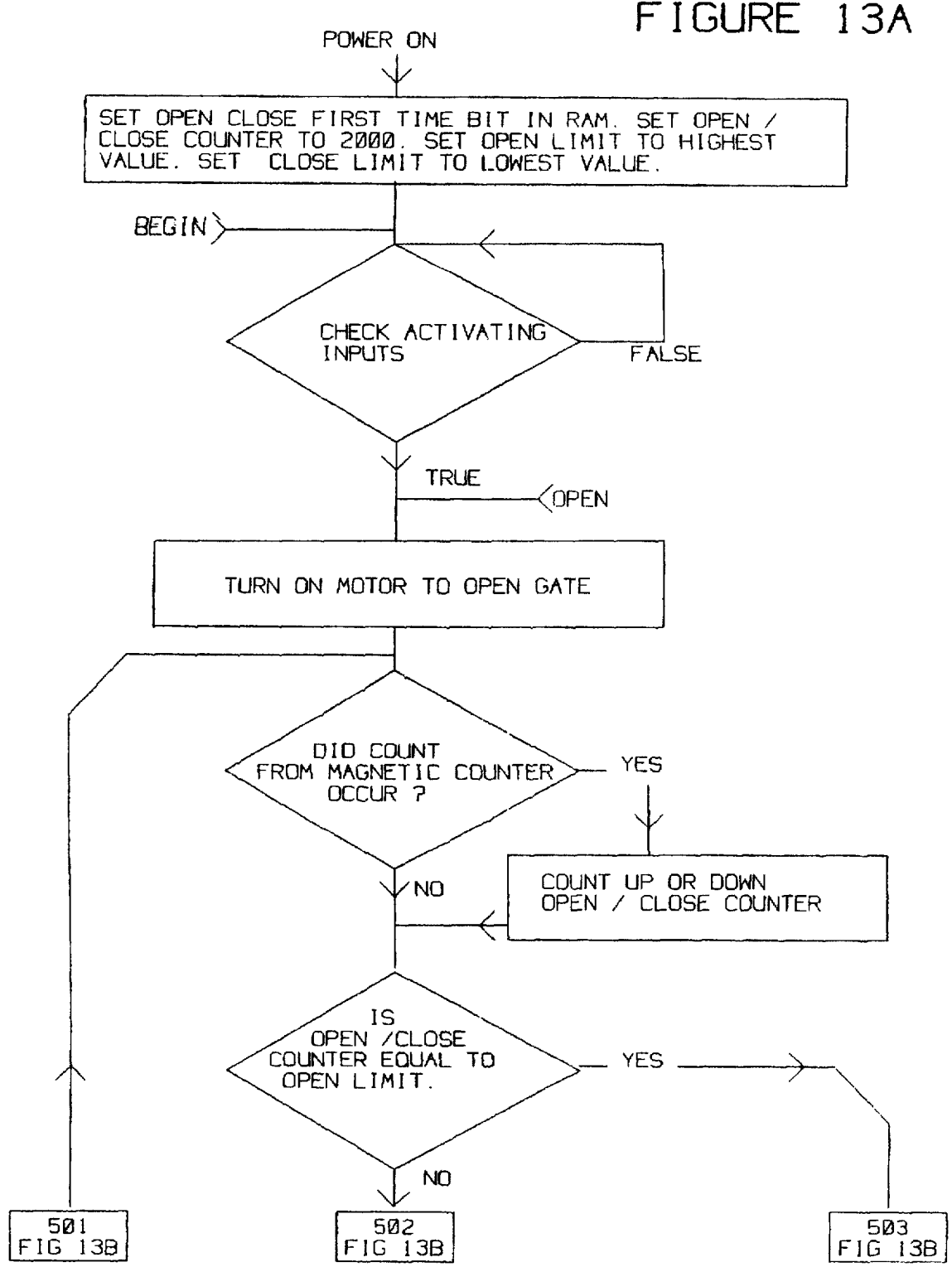
Figure 13C:
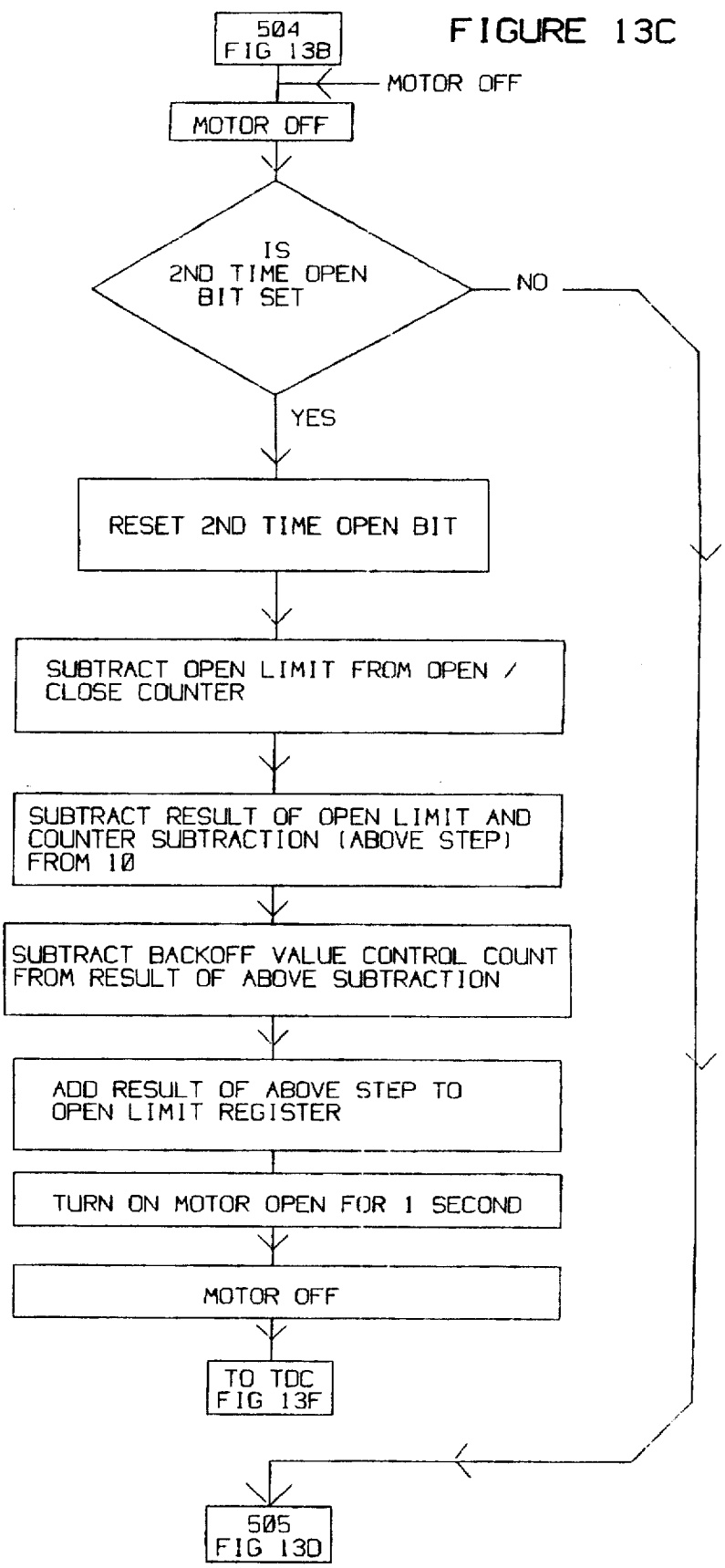
Figure 13D:
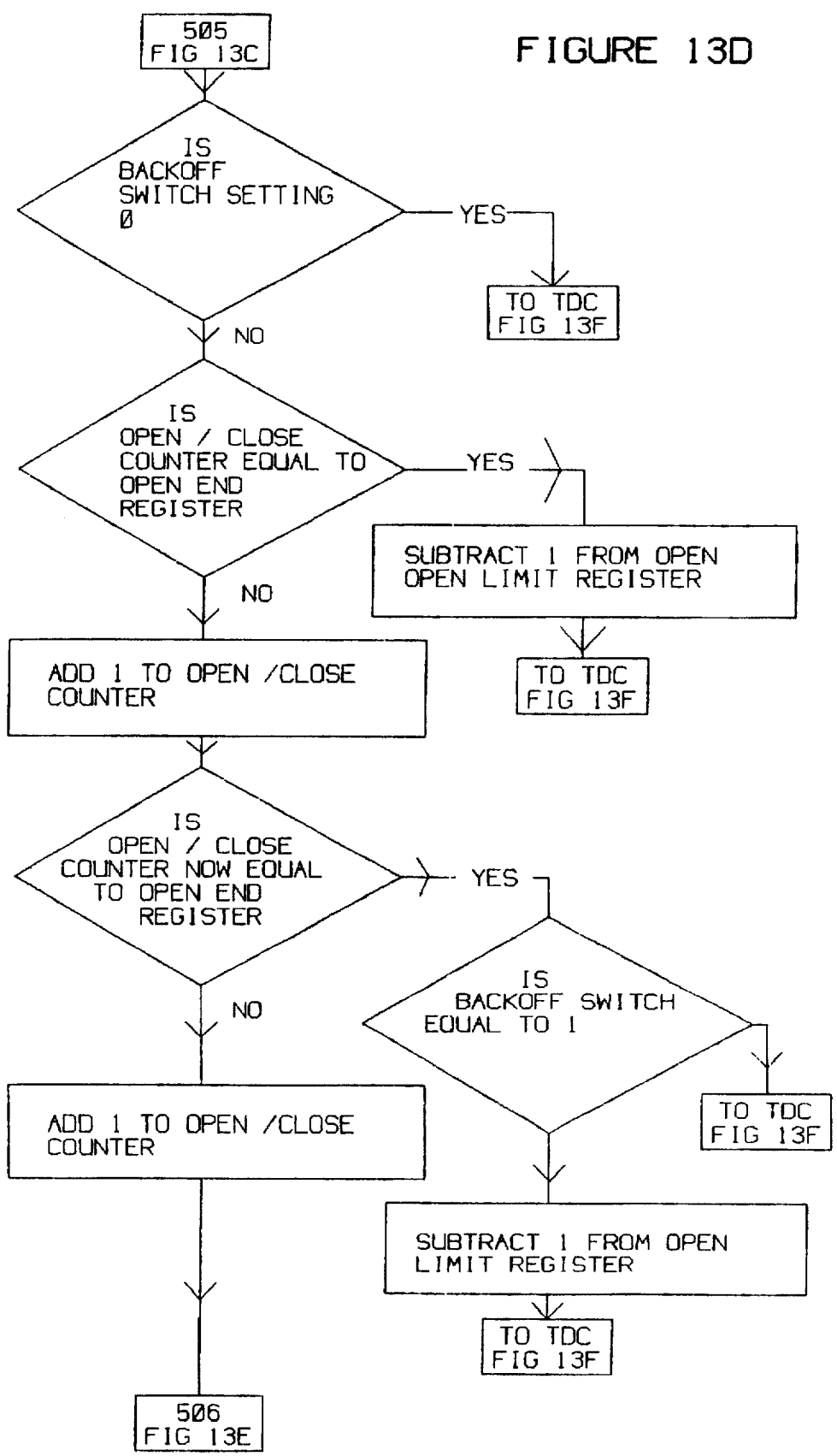
Figure 13E:
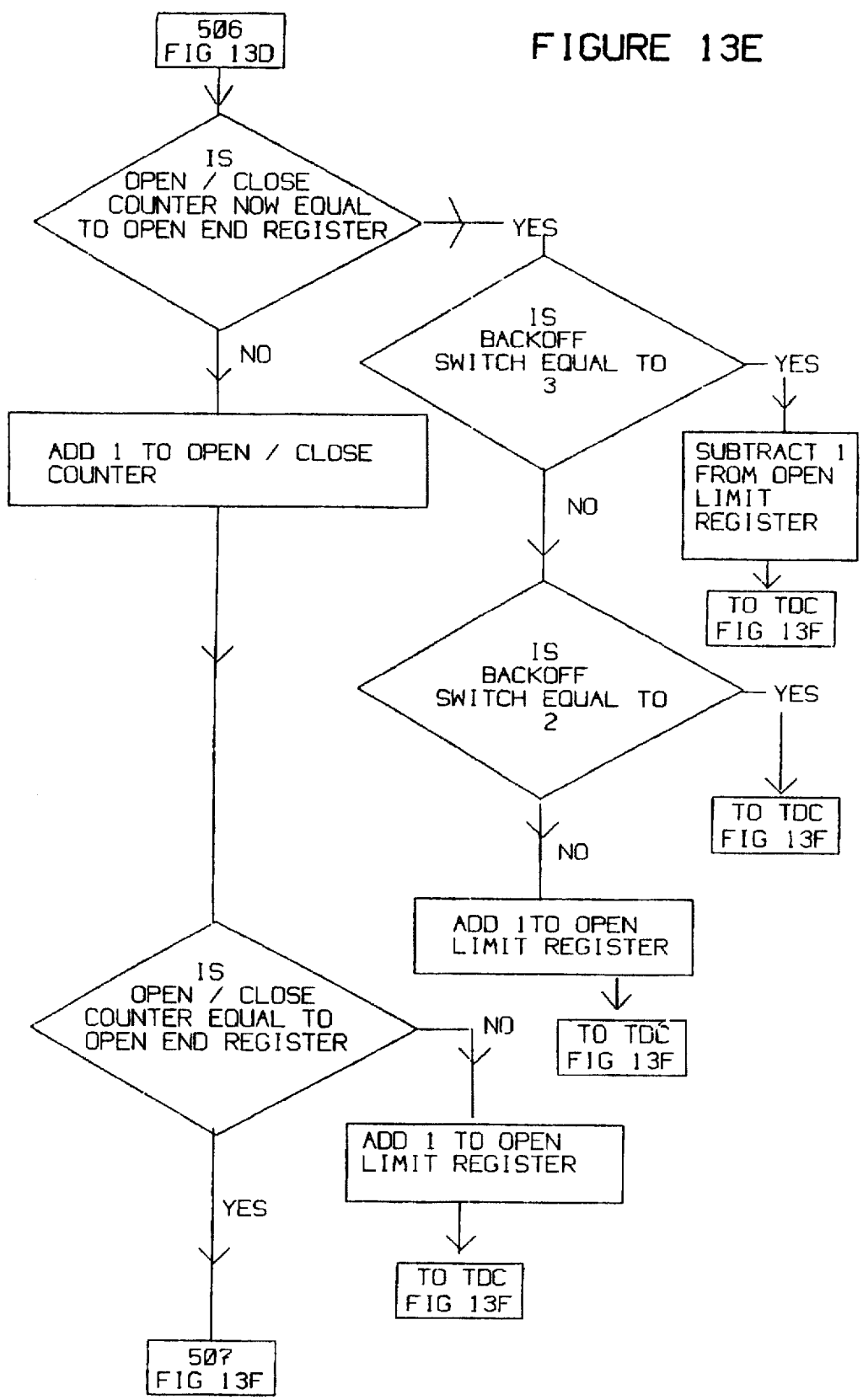
Figure 13F:
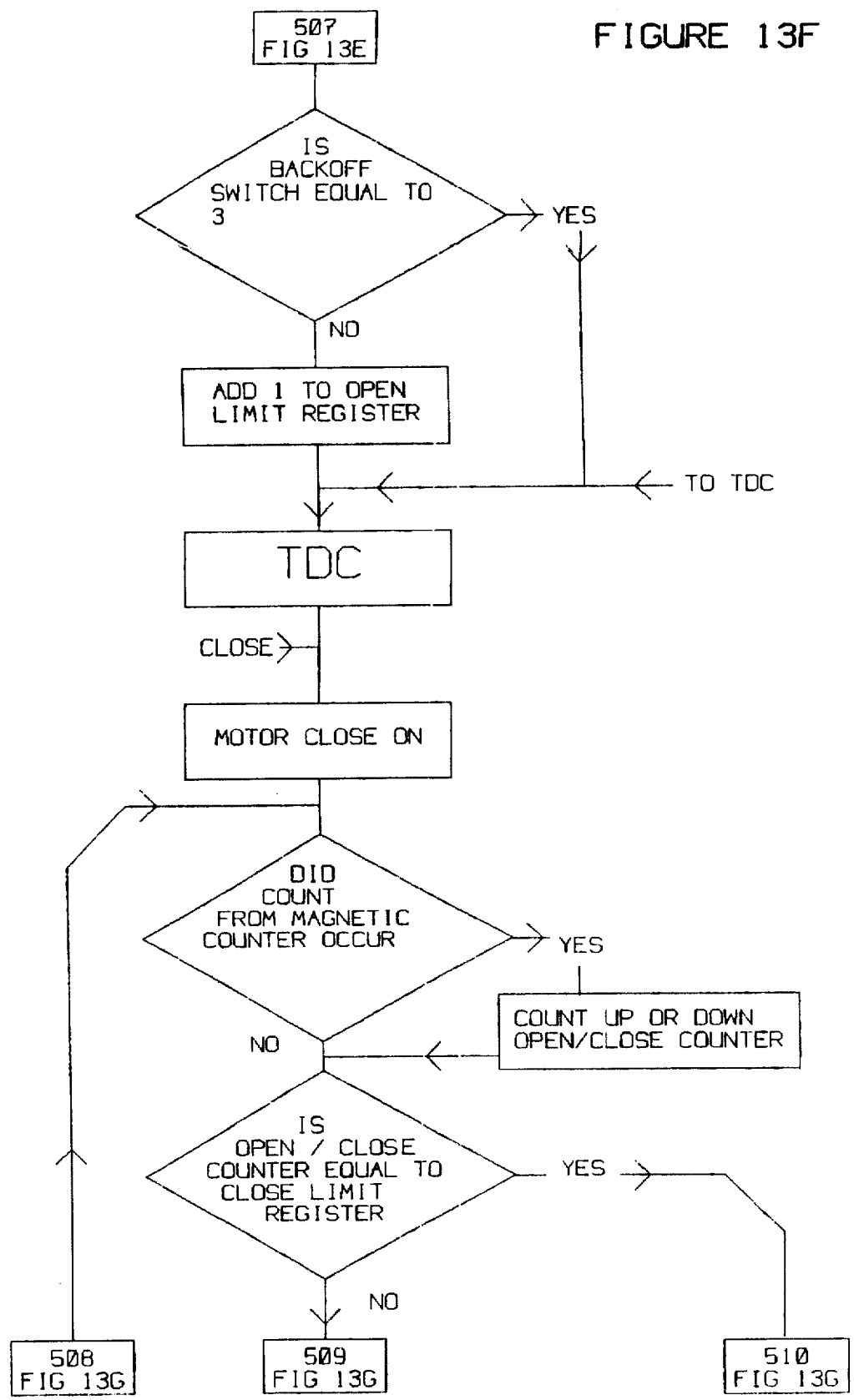
Figure 13G:
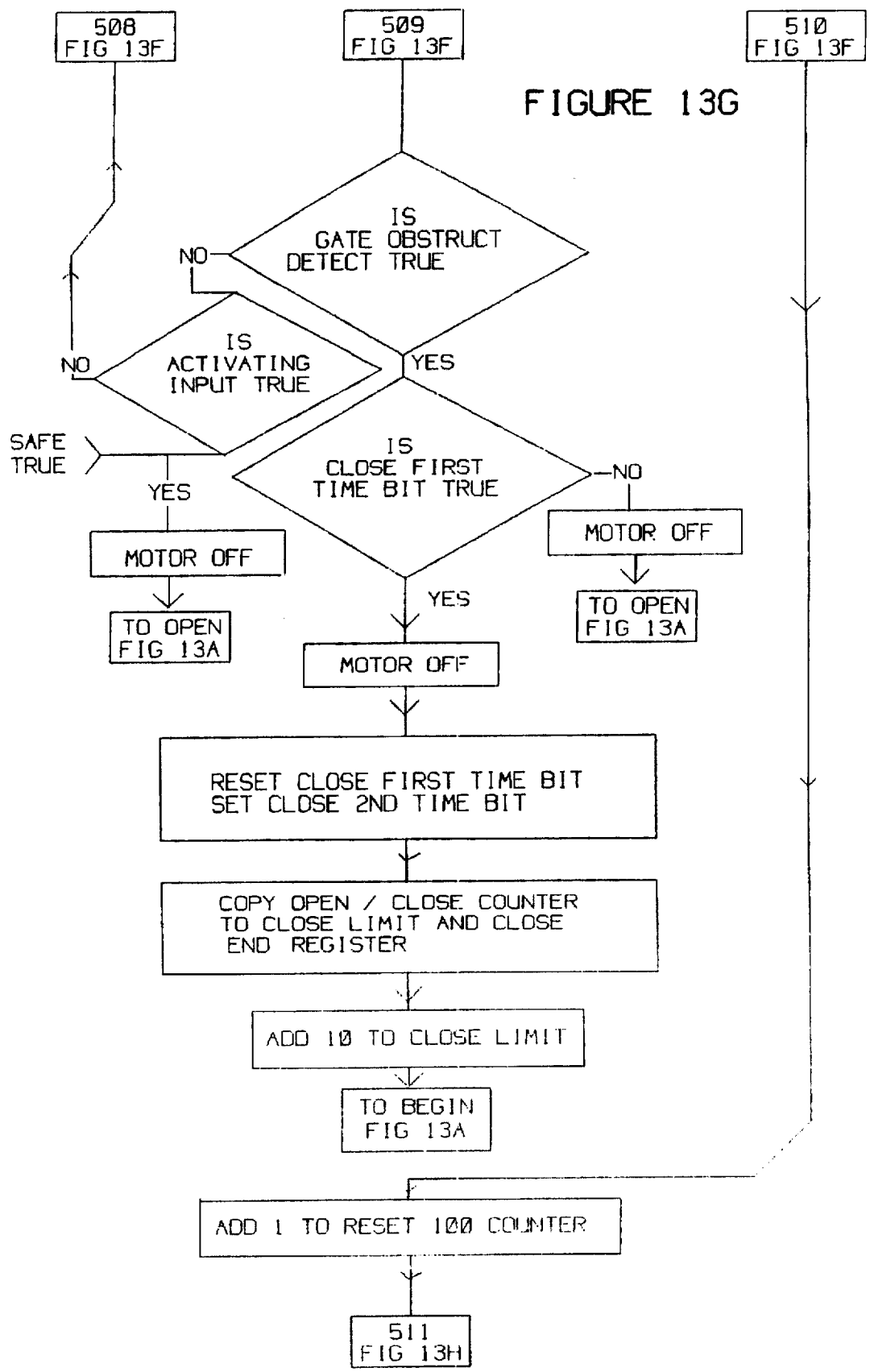
Figure 13H:
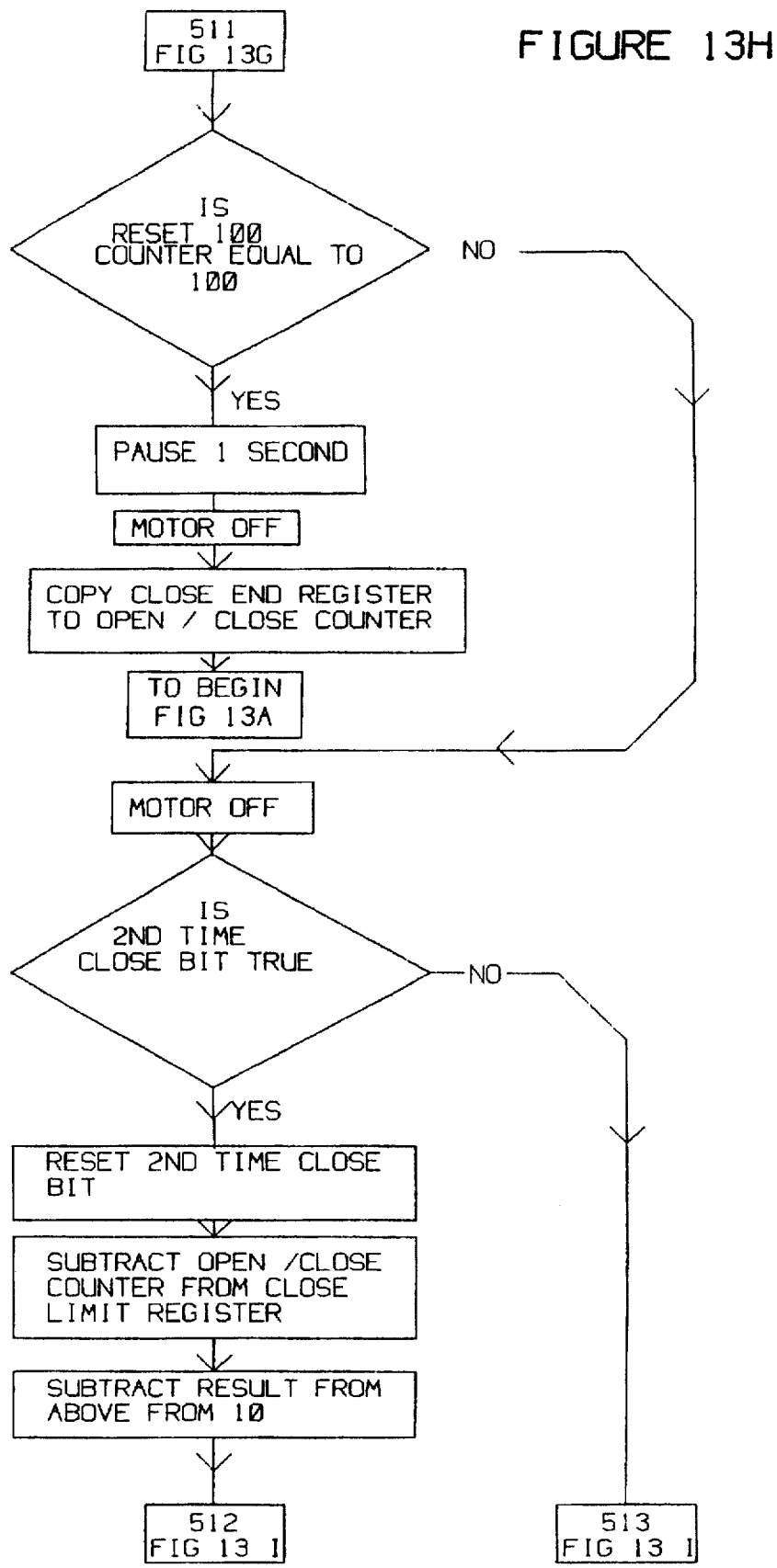
Figure 13J:
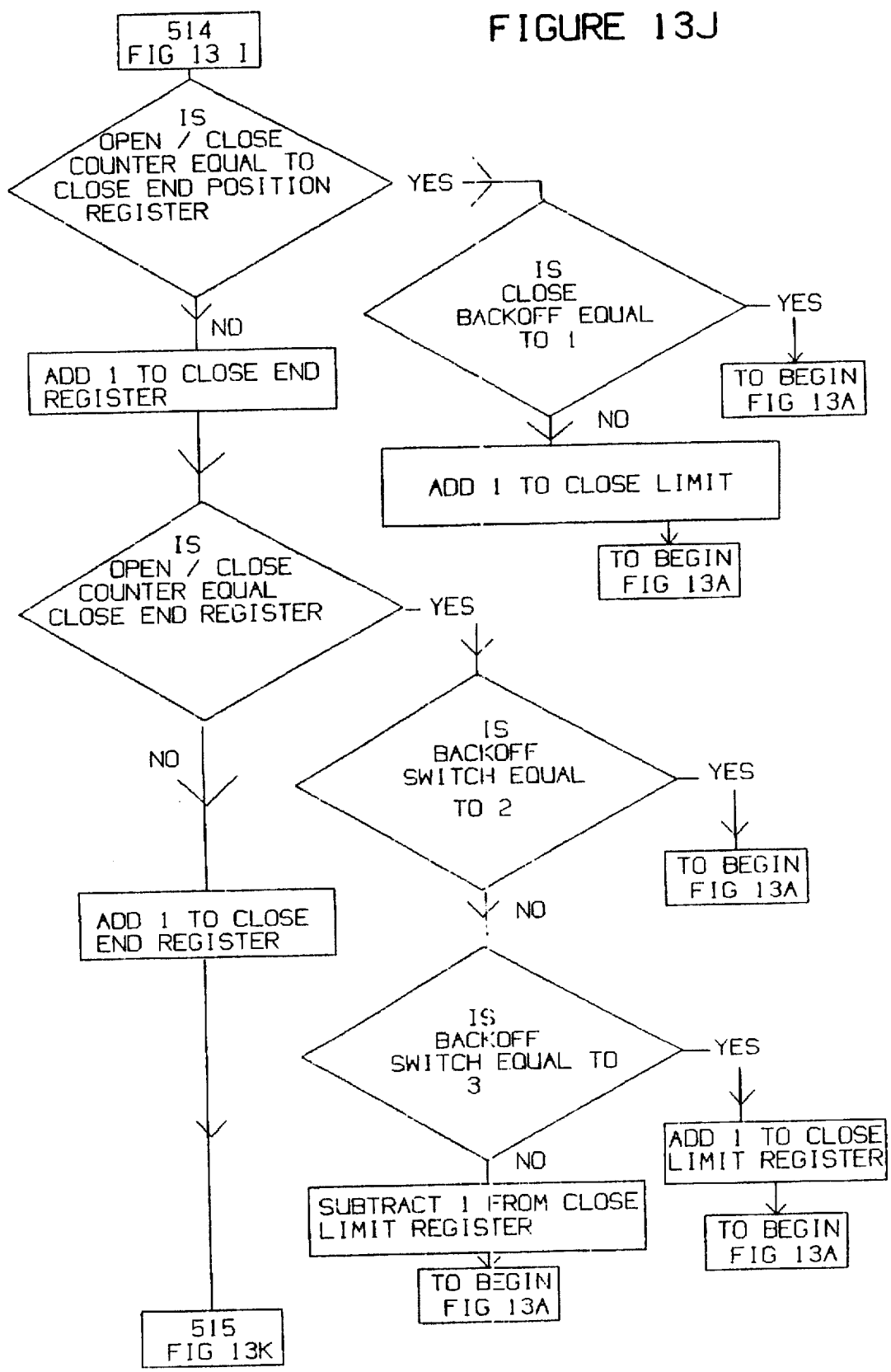
Figure 13K:
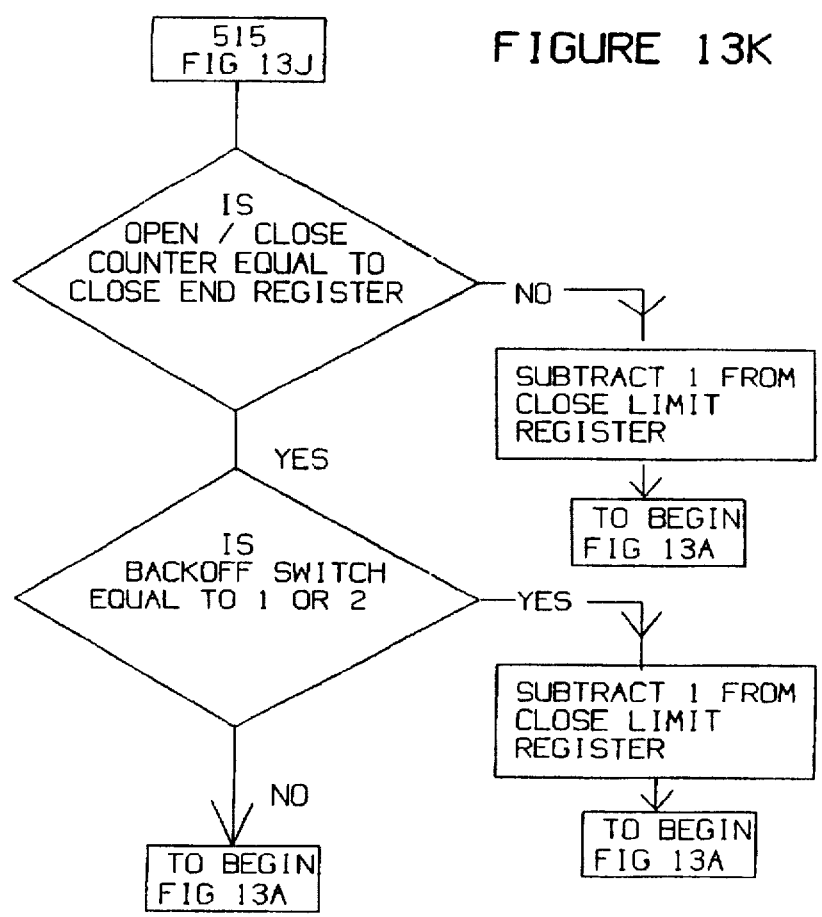
Figure 14A:
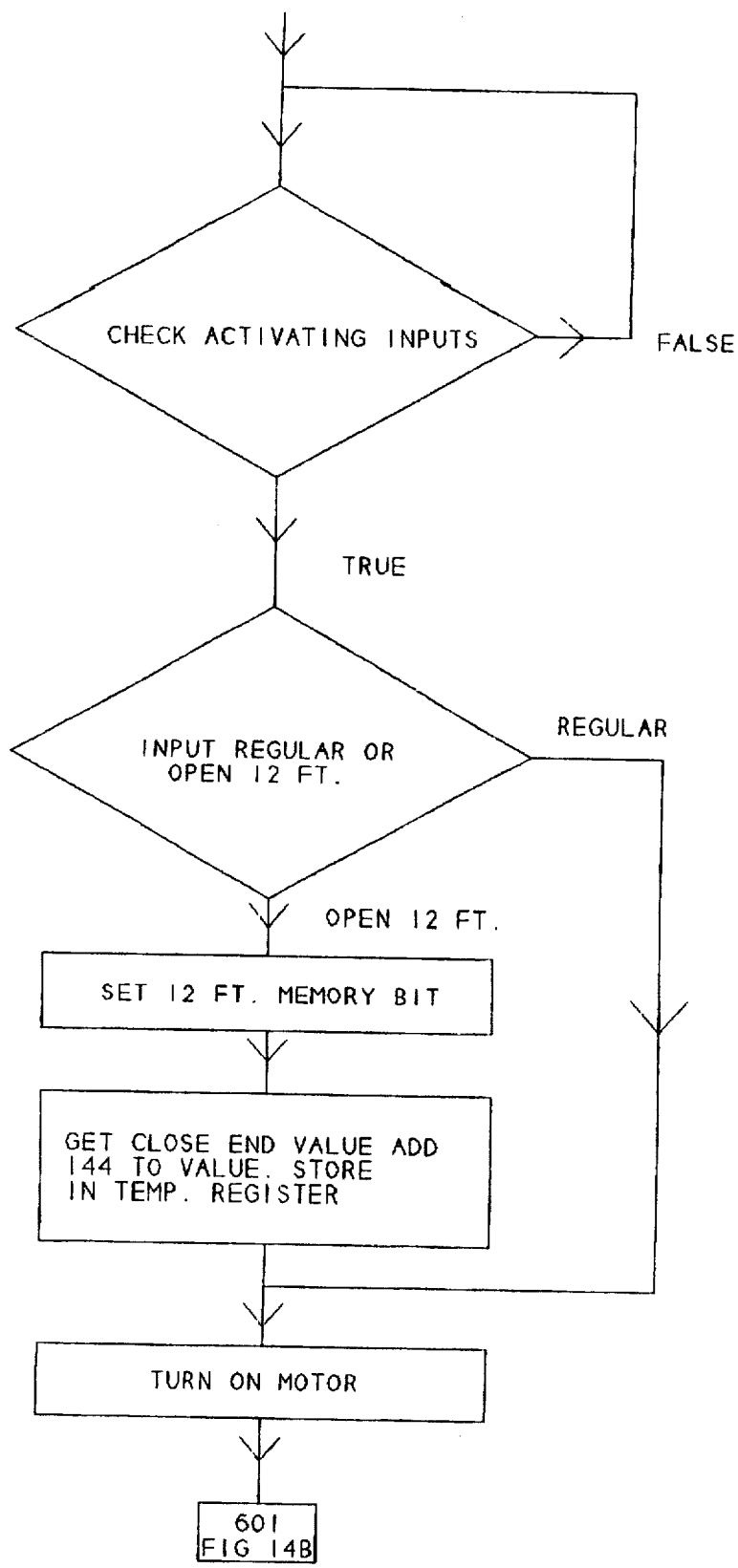
Figure 14B:
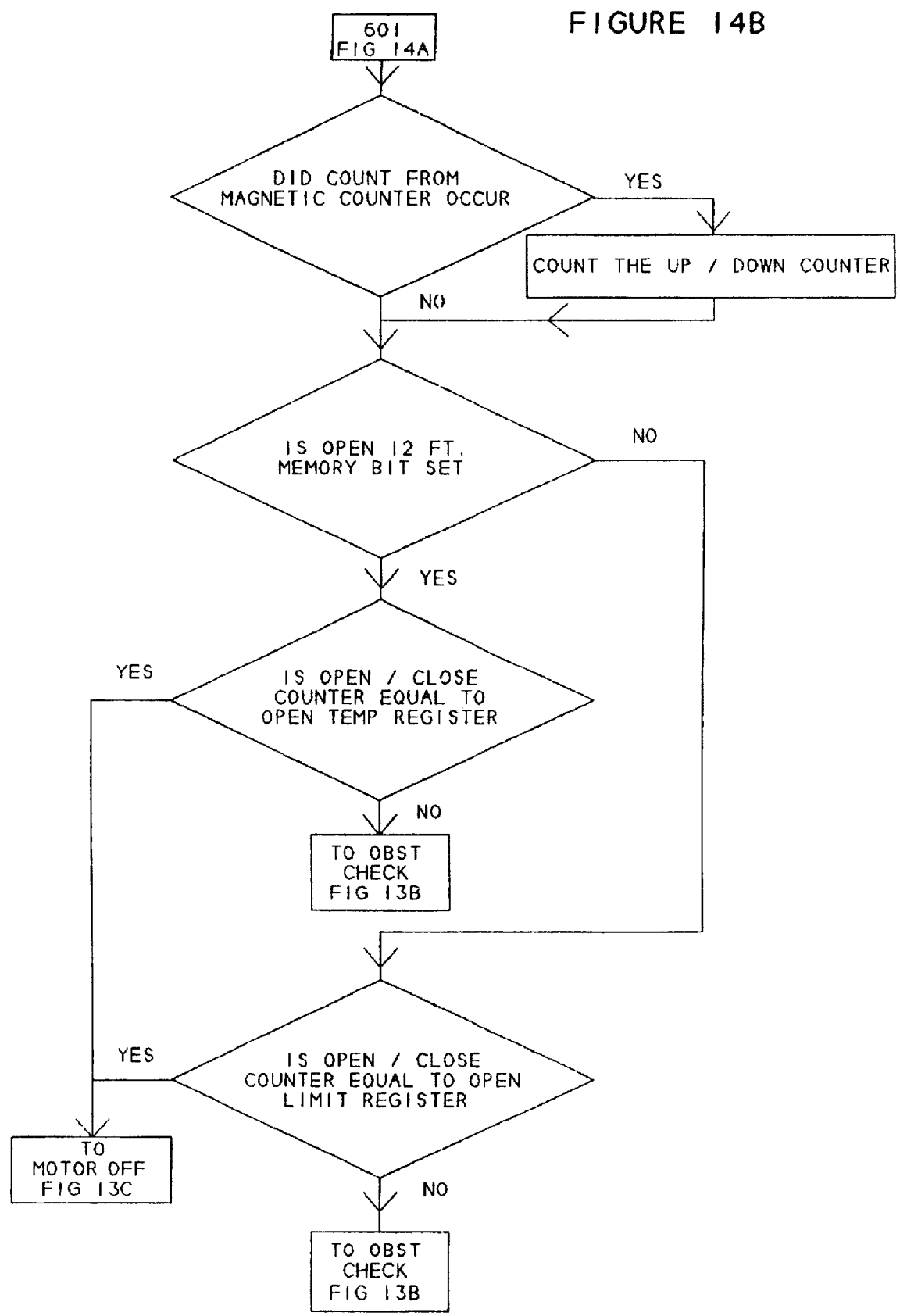
Figure 15:
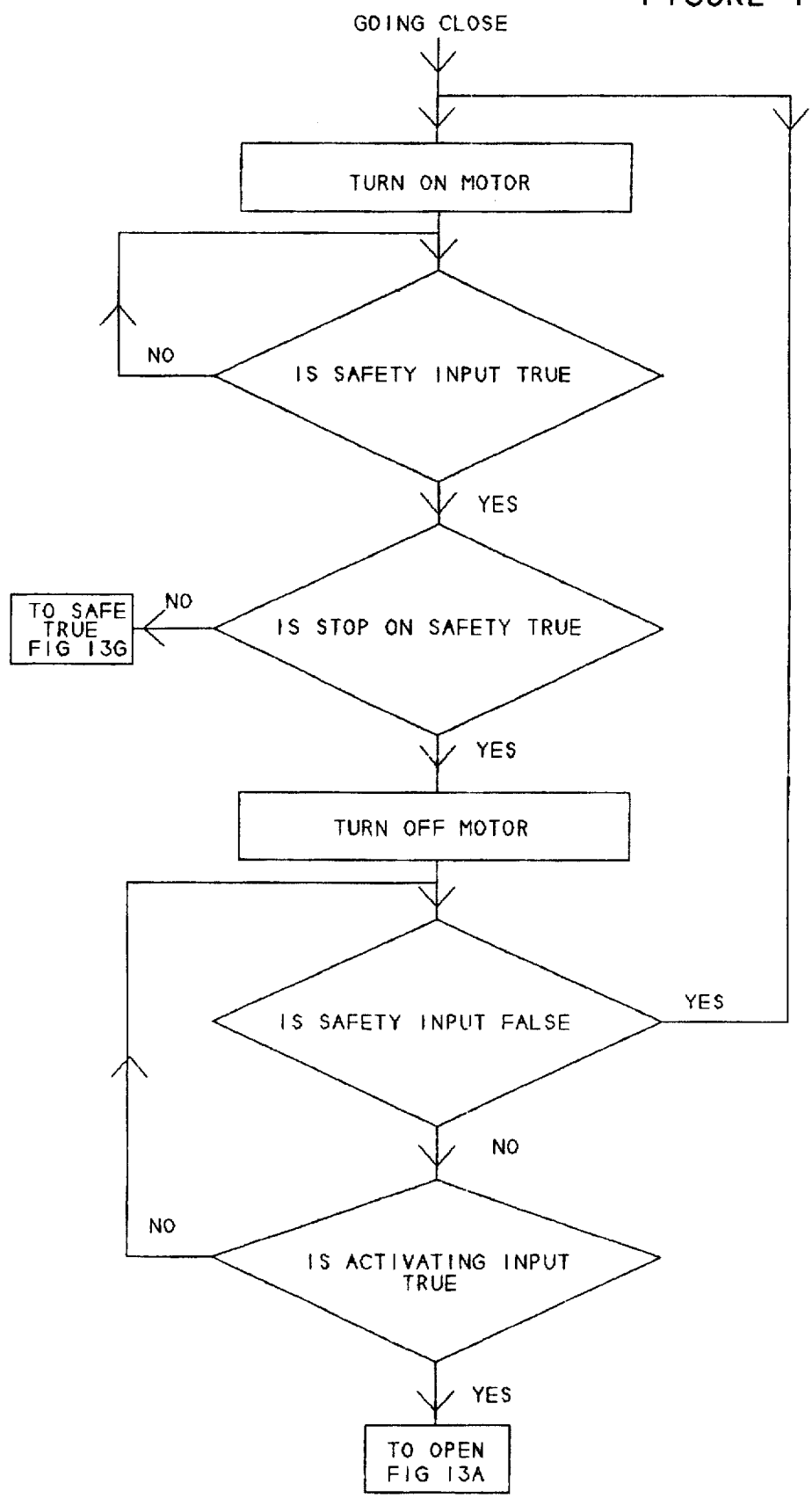

Having thus described the invention in general terms, reference will now be made to the accompanying drawings in which:

FIG. 1 is a fragmentary front elevational view of a gate movable between a gate opened position and a gate closed position;

FIG. 2 is a broad schematic diagram showing some of the major components forming part of the control system in the gate operator of the present invention;

FIG. 3 is a side elevational view of a portion of the drive mechanism showing the use of Hall effect sensors and magnetic elements for generating counts used in measurement of gate movements in the gate operator;

FIG. 4 is a fragmentary side elevational view of some of the components in the drive mechanism and the detecting mechanism forming part of the gate operator of the invention;

FIG. 5 is a plan view of the arrangement of magnetic elements used for generating counts in the present invention;

FIG. 6 is a schematic exemplary side elevational view showing a gate moved from a fully closed position to a fully opened position and a number of counts generated thereby;

FIG. 7 is a schematic exemplary side elevational view of the gate of FIG. 6 and showing the gate returned to a coasting position;

FIG. 8 is a schematic exemplary side elevational view, similar to FIGS. 6 and 7, and showing a gate having coasted from a coasting position to a final rest position in advance of a fixed end position;

FIG. 9 is a schematic exemplary side elevational view, similar to FIGS. 6–8 and showing a gate moved to a position represented by a corrected coasting count;

FIG. 10 is a more detailed circuit schematic showing the major components forming part of the circuit of the present invention;

FIG. 11 is a schematic top plan view showing a safety loop sensor arrangement used with the gate operator of the present invention to preclude tailgating;

FIG. 12 is a schematic diagram showing the register arrangement used in the memory of the invention along with back-off switches operating in conjunction therewith;

FIG. 13, comprising FIGS. 13A–13K, is a schematic logic flow diagram showing the major steps in effectuating the operation of the invention;

FIG. 14, comprising FIGS. 14A and 14B, is another schematic logic flow diagram showing those steps used in the preventing of tailgating with the operator of the present invention; and FIG. 15 is a further schematic logic flow diagram showing those steps used in effectuating the operation of a modified form of anti-tailgating mechanism.

DETAILED DESCRIPTION OF A PREFERRED EMBODIMENT

Referring now in more detail and by reference characters to the drawings which illustrate a preferred embodiment of the present invention A designates a gate operator shown with operative connections to a longitudinally shiftable gate G, often referred to as a "sliding gate." In this case, the gate G is shiftable from a closed position CP across an access opening to an open position OP and from the opened position OP to the closed position CP by means of the gate operator. The gate G may be part of any conventional construction and, as such, does not form part of the present invention per se. The gate is conventionally provided with rollers 20 and which are movable along a trackway 22, the later of which is fixed to the ground or other supporting surface.

In essence, gates of this type are used with security apartment buildings and similar commercial establishments and dwelling structures. The access opening permits passage of either people or vehicles and the gate can be shifted from the closed to the opened position for such access. Generally, many commercially available prior art gate operators use a radio frequency receiver-transmitter system, such that the party desiring to open the gate will actuate the transmitter to generate a radio frequency signal which causes a receiver to energize a motor for shifting the gate. The transmitter-receiver system of this type operates as a switch. In this respect, the apparatus of the present invention can be used with a key operated system or with the conventional radio frequency operated transmitter-receiver system.

The gate G is connected to a gate operator A through a continuous drive chain 26. The drive chain 26 is trained about a drive sprocket 28 located in the operator 24 and also about a similar idler sprocket 30 on a fixed structure 32. Further, the gate is attached to the drive chain by a suitable coupling 34, all as best shown in FIG. 1. The exact details of this drive arrangement, not including the details of the operator A, are essentially conventional and therefore not described in any further detail herein. However, by reference to FIG. 1, it is to be noted that the gate G would move between a fully opened position where the left-hand end of the gate would be located at the line designed "OP" and would also be normally moved to a fully closed position, where the left-hand end of the gate G would reside at the line designated "CP" and the right-end would lie at the line designated "OP."

The gate operator A includes a drive mechanism 36 which is more fully illustrated in FIGS. 3–5 of the drawings and comprises an electric drive motor 38, having a motor sprocket 40 connected thereto. A drive belt 42 is trained around the motor sprocket 40 and a similar sprocket 44, as shown in FIG. 4. The sprocket 44 is mounted on a shaft 46 journaled in a fixed plate 48 forming part of the operator housing and is connected to a clutch 50, as shown.

In accordance with the construction of the drive mechanism 36, as shown in FIG. 4, it can be seen that energization of the motor 38 will cause rotation of the drive sprocket 40 and the associated sprocket 44 through the drive belt 42. The left-end of the drive shaft 46 would be connected to the drive sprocket 28 which causes opening and closing movement of the gate G, as aforesaid.

Mounted on the opposite end of the drive shaft 46 is a magnetic assembly 52 forming part of a detecting means and which comprises a disc 54, having a plurality of magnetic elements 56 connected thereto and which will, in effect, rotate with the shaft 46. By reference to FIG. 5, it can be seen that there are three north pole magnets, 56a, 56b and 56c and one south pole magnet 56d, all for reasons which will presently more fully appear.

The individual magnets 56 are located in close relationship to a fixedly positioned Hall effect sensor 57 mounted on a fixed bracket 59 in the gate operator A. The Hall effect sensor 57 is of a conventional construction and is therefore neither illustrated nor described in any further detail herein.

The main components which form part of the control system in the gate operator A constitute the motor 38, along with a counter 60, a memory 62, such as a programmable "read only" memory, a control unit 64, such as a microprocessor control unit, and a switch 66. As indicated previously, the switch can adopt a variety of forms, such as a radio frequency remote control unit, a manually operable switch, or the like.

The switch 66, which is schematically illustrated in FIG. 2, may actually constitute a radio frequency input 70, or a mechanical switch input 72, as shown in FIG. 10. These two inputs can be added at an AND gate 74 and introduced into a central processing unit 76 forming part of the microprocessor central control unit 64. The microprocessor central control unit 64 may also include the memory 62, as well as latch circuits 78, as shown in FIG. 10. When an input signal is received from the AND gate 74, as, for example, an RF input signal or a switch input signal, or any other type of input signal, the central processing unit 76 will access stored counts in the memory 62 and ultimately submit a signal to a motor controller 80, which, in turn, controls the operation of the motor 38. The central processing unit will operate in conjunction with an arithmetic control unit 82 to add and subtract counts, as heretofore described and as also hereinafter described in more detail. These counts are also generated through a signal generator 84 and a counter 86. Timing, if necessary, may be provided by one or more clocking oscillators 88, as also shown in FIG. 10.

When the gate G is located at a fully opened position, as shown in FIG. 6, the left-hand end thereof will be located at a count designated as "0." Assuming that when the gate G is moved from the fully opened position, as shown in FIG. 6, to a fully closed position, a count of 500 between fixed end positions would be achieved. This would, in effect, be equivalent to 125 rotations of the shaft 46. Inasmuch as four magnets effectively rotate with the shaft 46, each rotation of the shaft 46 would constitute four counts. When the gate G is initially moved from the closed position to the open position, the motor 38 is energized and drives the gate G from the fully closed position to the fully opened position, as shown in FIG. 6.

When the shaft 46 has made one one hundred twenty-five shaft rotations, a count of 500 will be generated, as aforesaid. This count is stored in the memory 62. When the gate G is to be returned to the closed position, the motor 38 will only be energized to move the gate G to the coasting position, as illustrated in FIG. 7. Assuming that 15 counts were programmed into the control unit 64 as a coasting count, then the gate G would be driven for a driving count of 485 counts or pulses and thus, short of the fully closed position by 15 counts to a coasting position. At that point, the motor controller 80 and hence, the motor 38 are de-energized and the gate G is allowed to coast toward the fully closed position. If the gate G reaches the fully closed position, the microprocessor control unit 64 will recognize that there is no error count. As a result, on future opening and closing operations, the microprocessor control unit 64 will cause the motor controller 80 and the motor 38 to energize movement of the gate G for 485 counts to the coasting position and thereafter, allow the gate to coast to the fully closed or fully opened position.

In actuality, the present invention operates such that the gate G is moved to the fully opened position for 500 counts and thereafter moved to the fully closed position for the full 500 counts. On the second opening of the gate G, the gate is then driven only to the coasting position and on the second closing, the gate G is driven only to the coasting position.

When the gate is allowed to coast from the coasting position, as illustrated in FIG. 7, toward the fully closed position, if the gate G is shy of the fully closed position by an equivalent of three counts, the gate G will have stopped at a position equivalent to 497 counts. The microprocessor control unit 64 will recognize that the gate G did not travel to the fully closed position inasmuch as the microprocessor control unit 64 will only have detected twelve coasting counts, as opposed to the expected fifteen coasting counts. Consequently, the microprocessor control unit 64 will automatically add three additional error counts to the number required to move the gate G to the fully closed position on subsequent occasions. Otherwise, the microprocessor control unit can be programmed to sequentially add one or two additional error counts on each subsequent occasion when the gate is moved in that same direction which the gate reaches the fully closed position.

When the gate G is moved to a fully opened position equivalent to e.g., 500 counts, and fifteen coasting counts are programmed into the apparatus, the microprocessor control unit 64 will only cause subsequent movements for 485 counts. However, if a control signal of three counts is generated, then on subsequent movements, the microprocessor control unit 64 will drive the gate G for 488 counts. In this way, the gate G should then reach the fully closed position precisely and without any hard impact against any fixed structure.

In effect, the microprocessor control unit 64 can be operated in two modes when a gate is shy of and has not travelled the full distance to reach a fully closed position. In one mode, the microprocessor control unit can be operated to add the missing number of counts required to move the gate to a fully closed position. Thus, if the gate were required to move for a distance equivalent to 500 counts to a closed position and only moved for a distance equivalent to 495 counts, the microprocessor control unit could be operated to add 5 counts. Otherwise, in a second mode of operation, the microprocessor control unit could be operated to add only a predetermined number of control counts as, for example one or two control counts on each subsequent gate movement in the same direction. Thus, if the gate moved for a distance equivalent to 495 counts, the microprocessor control unit could add one additional control count on each subsequent movement in the same direction until the gate reached the fully closed position.

In a preferred mode of operation, it is desirable to program the gate operator so that the gate actually stops just shy of a fully opened position or a fully closed position. Thus, as a simple example, if 500 counts were measured for the fixed end position movement, that is, movement from one end position to the other, then the control means would be operated to thereafter stop the gate at a count of 499. Thus, if the gate were driven for 490 counts and allowed to coast, if the gate coasted a full 10 counts, the gate would stop precisely at the full end position of 500 counts. In this case, the operator would be programmed so that on additional movements, the gate would be driven with a drive count of 489 counts and allowed to coast for 10 counts to a position of 499 counts. In this way, when conditions change, if the gate reaches the full end position of 500 counts, the controller may recognize that the gate has actually slammed into a fixed structure at the fixed end position. Thus, the controller will always recognize the fixed end position count as one count less than that actually measured. If the fixed end position count were measured as 500, then the controller will recognize a fixed end position count of 499. Consequently, the microprocessor control unit 64 will cause the arithmetic control unit 82 to subtract a control count from the fixed end position count of 500. If, on the next subsequent closing condition, the gate G still slams at the closed position, the microprocessor control unit 64 will cause another control count to be subtracted. At the point when the gate G reaches one count shy of the fully closed position, and does not slam into any fixed structure, the microprocessor control unit 64 will recognize that the desired count has been achieved.

As indicated previously, the present invention can be used for automatically calibrating a gate movement without the coasting feature. Thus, again assuming that a gate travels from one fixed end position to the opposite end position and generated a fixed end position count of 500, the control unit would automatically increment or decrement a number of counts if the gate were short of the full open position or the full closed position. Thus, if the gate reached 497, the control unit would increment the number of counts for driving the gate by 1, 2, or 3, depending upon settings of back-off switches, as hereinafter described. If the back-off switches were set to increment by one count, the control unit would cause the gate to move to position 498. Thereafter, the control unit would then cause the gate the move to position 499. At this point, the control unit would consider the gate to be at the fully closed position, as previously described.

On the other hand, if the gate was driven and contacted position 500, then the control unit would start decrementing the driving count by one count on each subsequent movement. This would occur until the gate actually stopped at one count just shy of the fully closed position.

It should again be understood that the control unit perceives of the fully closed position as one count shy of the actual fully closed position and perceives of the fully opened position as one count shy of the fully opened position.

As indicated previously, the control unit comprises a memory 62. In order to accomplish the functions of the memory, there are actually a plurality of memory registers which are used. In this respect, the memory is actually a random access memory. For purposes of understanding actual operation of the memory, the individual registers which are employed are more fully illustrated in FIG. 11 of the drawings. The memory 62 comprises an open end register 90 which is provided for storing the highest count which an open/close counter 92 will reach when the gate contacts the end position on the first opening. In this respect, the open end register 90 is often set to the highest possible limit so that the gate will always contact the fixed end position on the first opening and closing movements. Nevertheless, as the gate is moved for the first time from the closed to the opened position, and also from the opened to the closed position, the counter 92 will count the number of counts generated and store that count in the open end register.

As shown in FIG. 12, the memory 62 also comprises an open limit register 94 which stores the gate opened limit value, that is, the number of counts required for driving a gate from either the full opened position or full closed position to the coasting position. In other words, the open limit register stores the driving count.

The memory 62 also includes a close end register 96 and a close limit register 98. These registers perform essentially the same functions as the open end register 90 and the open limit register 94, respectively, except for movement of the gate to the closed position.

Also referring to FIG. 12, it can be seen that there are two back-off switches, such as an open back-off switch 100 and a closed back-off switch 102. These switches are essentially manually operable switches which are operable generally by the installer and usually have four positions, such as "0", "1", "2", and "3." The open limit register 94 and the close limit register 98 will cause generation of control counts, based on the setting of these back-off switches. Thus, if the back-off switch is set to position "2", the two control counts will be added to the driving count. In effect, these two counts constitute the control count when the gate effectively is overdriven. The counts from the open back-off switch and the closed back-off switch would not constitute the control count if the gate undershoots the end position, since the control unit itself will determine the fact that the gate is shy of the fixed end position and the number of counts by which the gate is shy from the fixed end position.

A reset register 104 is also provided for resetting the open end register 90 and the close end register 94 on a selected large number of openings or closing as, for example, every 100 openings and 100 closings. In this way, the reset system will account for any aberration which may have arisen in the operation of the controller.

The open limit register 94 and the close limit register 98 effectively serve as the comparison registers. These registers will compare the count stored therein against the counts which are generated each time that a gate reaches an open position and a closed position. In this way, the open limit register 94 and the close limit register 98 can be constantly reset to include new limits and account for changes in the gate driving system or the external environment which affects the movement of the gate.

In the above-identified U.S. Pat. No. 4,159,599 by Moscow K. Richmond, et al., a positioning system for positioning a gate between fully opened and closed positions is provided. The present invention, however, provides a more precise way of refining the movement of the gate to the fully opened or fully closed position and without any slamming movement into a fixed end position. Hence, the present invention represents a substantial improvement over all prior art gate operators, since it provides for an automatic fine adjustment.

It can be seen that the gate operator of the invention can automatically recalibrate from time to time as conditions might change. In this way, there is essentially little or no hard impact of the gate with a fixed structure. The same holds true in case of power outages. Here again, the gate operator A can effectively reprogram the movement of the gate G in the same manner as previously described. In order to ensure that there are no aberrations which might be introduced into the system, the microprocessor control unit 64 can also be programmed to automatically initiate a new measurement on a predetermined number, e.g., each one hundred closings or openings.

It is important in connection with the present invention for microprocessor control unit 64 to know that the control unit 64 is actually synchronized to the actual position of the gate. In effect, the microprocessor control unit 64 literally tracks the position of the gate and in effect, must be tracking the position of the gate to accurately stop the gate at the full end positions of the gate G. In this case, arrangement of the magnets 56a, 56b and 56c, as well as 56d, is important. The plurality of the magnets will actually be sensed by the Hall effect sensors. If the three magnets in the direction of rotation are of one polarity and the other magnet is of a different polarity, then it is possible to detect false pulses which may arise from time to time, as, for example, through electrical spikes or the like.

If three of the sensors as, for example, the magnets 56a, 56b and 56c were all of the north pole polarity, as shown in FIG. 5, then the control unit 64 recognizes that on each rotation it should detect three north poles and one south pole. If there is an electrical aberration and which appears as a south pole detection, for example, then the microprocessor will recognize the three north poles and two south poles and immediately recognize that there is an electrical aberration. In this way, the microprocessor control unit 64 will also automatically know the direction of movement. On the other hand, if the Hall effect sensors detect two north pole magnets and a south pole magnet, and then on a subsequent rotation detect three more north pole magnets, the microprocessor control unit 64 will also again know the direction of rotation and hence, the direction of movement of the gate G.

FIG. 13 illustrates those steps involved in the actual operation of the gate operator. The following description will effectively describe the operation of the gate operator in conjunction with the flow diagram of FIG. 13. In the flow diagram, reference letters, such as "A" and "B", etc., are set forth beside certain groups of operations. These are coordinated to the following description in which portions are designated as "Stage A", "Stage B", etc.

Initially, the flow chart explanation will describe the first opening and first closing of a gate, followed by the second opening and closing operations and the normal operation.

THE FIRST OPENING AND CLOSING OPERATION

When power is turned on, and the gate is opened or closed for the first time, a flag in the memory, and particularly the random access memory, is set. Further, the open/close counter 92 is also set to an exceedingly high count of, for example, 2,000. Assuming that the open/close counter 92 has a maximum count of 4,000 counts, this is more than sufficient to assure that the gate will always reach the opposite end position.

When the motor is energized for moving the gate, the open/close counter 92 will count up. When the gate is moved to the closed position, the counter 92 will count down. On the initial power-up, the counter is in the middle of the range to achieve either a maximum opening count and a maximum closing count. The open limit register 94 and the close limit register 98 are respectively set to very high and very low values so that the counter 92 will never equal the opened limit or the closed limit on the first opening and the first closing. In this way, the gate will always contact a fixed structure at each of the end positions on the first opening and closing cycles.

Stage A

The open limit register 94 and the close limit register 98 are set to very high and very low values so that the counter 92 will never equal the opened limit or the closed limit in the first opening of the gate and the first closing of the gate. The gate will therefore always bang into or engage with the physical structure at the end position on the first opening and the first closing.

Stage B

On the first gate opening and the first gate closing, after the initial power-up, because the open limit register 94 and the close limit register 98 are set to excessively high and excessively low values, a comparison with the count established by the counter 92 will never occur. The program will therefore cause an exiting of the opened loop when the gate contacts a physical stop and an obstruction detect will proceed, e.g., turn "true", as shown in FIG. 12.

Stage C

When the obstruction detect is true, the opened first flag is checked. If it is not a first gate opening, the motor is stopped and the program causes a reversing of the gate, because the gate actually did contact an obstruction. If this is the first time that the gate is being opened or closed, that is the first time is true, the first time flag is reset and a second opened time flag or a second closed time flag is set.

Stage D

The count which is detected by the open/close counter 92 is introduced into the open limit register 94 or otherwise, the close limit register 98, if the gate is moving to the closed position. This count is also copied in the open end register 90, if the gate is moving to the opened position or the close end register 96, if the gate is moving to the closed position. A preselected number of counts, as for example, ten counts, is subtracted from the count in the open limit register 94 so that on the second opening, the driving count will be ten less than it initially was for moving the gate the first time. The same holds true if the gate were moving to the closed position. The open/close counter 92 will thereupon measure the number of counts again. The motor is turned off and the program moves to the time delay close, as shown in FIG. 12.

Stage E

Referring now to that portion of FIG. 12 which refers to the time delay close (TDC), it can be seen that a timer holds the gate open for a set period of time. After this, the gate will proceed to the closed position.

Stage F

The same procedure which was described in connection with gate opening, also occurs while the gate is closing. Due to the fact that the close limit register 98 is set to zero, the open/close counter 92 will never equal the contents of the close limit register 98 on the first closing. The program will cause an exist of the closing loop when the gate obstruction detect goes through as the gate contacts the physical stop. Since the first time closed flag is true, the motor will be shut off, the first time flag will be reset and the second time flag will be set.

The contents of the open/close counter 92 is then copied to the close limit register 98 and the close end register 96 to record the count at which the gate will contact the physical structure at the end position. A count of ten is added to the close limit register 98 to stop powered movement of the gate ten counts short of the gate closing on the second closing.

The first opening and closing operations are thereupon complete. The fixed opened position and the fixed closed position are then stored in the limit registers and the limit registers are set for these end position counts, less a total of ten counts on the opening and ten counts on the closing in order to enable a coasting of the gate from the coasting position to the fixed end position.

SECOND OPENING AND CLOSING
OPERATIONS

Stage B

When the gate is opened the second time, the gate will exit the opening loop because the contents of the open/close counter 92 is equal to the contents of the open limit register 94 and hence the motor which drives the gate will be turned off. The same will hold true in connection with the second gate closing operation.

Stage G

The opened second time flag for gate opening is checked if true and the flag is reset. The same again is true for the closed second time flag. However, with regard to the opened second time flag, a calculation is now performed which is used to properly set the open limit register 94. The registers effectively used in this calculation are the open limit register 94, the open/close counter 92, as well as the opened back-off switch setting 100. The following example will illustrate the calculation which is performed:

| | |
|---|---|
| Fixed end position count = | 2,100 |
| Opened limit count = | 2,090 |
| Open/close counter = | 2,094 |

Since the coasting count is ten, as established by the open limit register, on the second opening, the motor is turned off at 2,090. In this case, the gate coasted to only four counts to 2,094. If the back-off switches are set to one, then the following takes place:

| | |
|---|---|
| Subtract open count limit from open close counter: | 2,094 − 2,090 = 4 |
| Subtract result from ten: | 10 − 4 = 6 |
| Subtract the back-off value (control count) from the six: | 6 − 1 = 5 |
| The resultant is added to the open limit register: | 2,090 + 5 = 5 |

2,095 is then the proper open limit setting for a coast of four counts and an open back-off (control count) of one count. The motor is energized, however, for operation for one additional second to ensure that the gate is fully opened in the second opening cycle. The program then moves to time delay closed (TDC).

Stage H

On the second time closing, the program will exit the loop when the open/close counter 92 has a count which equals that of the close limit register 96. The motor is then de-energized. The closed second time flag is checked. If true, the flag is reset. A similar calculation is performed on the open/close counter 92, the close limit register 98 and the close back-off switch 102. The following example illustrates this second time closing operation:

| | |
|---|---|
| Closed fixed end position count = | 1,900 |
| Close limit register count = | 1,910 |
| Open closed counter = | 1,905 |
| Closed back-off switch setting = | 2 |

On the second closing, the motor was de-energized at 1,910, allowing a ten count coasting. However, the gate only coasted to 1,905 for a total of five counts. Therefore:

| | |
|---|---|
| Subtract open/close counter from closed register limit | 1,910 − 1905 = 5 |
| Subtract the control count of five from the coasting count of ten | 10 − 5 = 5 |
| Subtract back-off switch switch setting (control count) of 2 | 5 − 2 = 3 |
| Decrement closed limit register by 3 | 1,910 − 3 = 1,907 |

In this case, 1,907 is the proper closed limit count value. To back-off counts will leave the gate two counts away from the actual end position. Again, the motor is normally operated in a closing cycle for one second to fully close the gate on the second closing cycle. The limits are now properly set and the gate can be moved by the gate operator in a normal operation.

NORMAL OPERATION

The normal operations function much in the same manner as the first two openings cycles and first two closing cycles, except that several procedures are not repeated since the first opened and closed time flags and the second opened and closed time flags are reset. If the gate obstruction detect is true, the gate will move to the opened position.

When the open/close count 92 is equal to the opened limit or the close limit register, the motor is de-energized. The gate will then coast to a stop. The value in the open/close counter register will be compared to the opened or closed fixed end position register count and the open or close back-off switches to determine if the gate coasted to the proper position. If the gate did coast to four, the limit will be adjusted backwardly. If the gate did not move far enough, the open limit register will be adjusted forwardly to compensate.

RESET REGISTER

In this case, the reset register is designed for operation after a predetermined number of openings or a predetermined number of closings of the gate. In this particular example, the reset counter is referred to as a reset 100 register, since it is adapted for operation after 100 openings or 100 closings.

The open/close register electronically tracks the physical position of the gate by counting magnetic pulse. If, for some reason, as, for example, an electronic spike, the electronic board missed a count, as, for example, an add count or a subtract count, the physical position of the gate and the count in the open/close register would not be synchronized. Thus, and in severe cases, the gate would strike a physical structure at an end position, either in the opened or the closed position. Each time that the gate closes, a counter is incremented and when the counter reaches 100, the motor is not turned off normally when the gate reaches a coasting position, but is allowed to run for one additional second. This will cause the gate to physically contact a structure at the fixed end position. The content of the close end register 96 is then copied into the open/close counter 92, thereby setting it to a known value matching the physical location of the gate. In this way, if an error occurs, it will be corrected within 100 operations of the gate.

FIG. 11 illustrates a safety loop sensor arrangement which minimizes the possibility of tailgating, that is, authorized entry into a secured area. In FIG. 11, a gate G is illustrated as being shown in the closed position against a fixed structure 110. The gate G is operatively connected to the gate operator for movement thereby in the same manner as previously described. For this purpose, the operator A is shown in FIG. 11 and designed to move the gate from the closed position, as shown, to the opened position, as shown by the dotted lines in FIG. 11.

A pair of safety loop sensors 112 and 114 are located with respect to the gate on opposite sides of the gate, as shown in FIG. 11. In this case, the sensors 112 and 114 may be electrical coils which are shown as being electrically connected to the operator A. Moreover, the coils are shown in solid lines for purposes of clarity, although normally they located under the ground surface and detect the presence of a vehicle through inductive coupling or the like.

The present invention provides two embodiments of a mechanism to minimize the possibility of tailgating into a secured area by an unauthorized individual or vehicle. In the first embodiment, the gate G is designed to move only a limited distance. Thus, the gate could normally be programmed to move only the limited distance for most passenger vehicles which utilize the switch input 72 or, for that matter, the RF input 70, or any other type of switch input. However, if it was necessary to open the gate to a fully opened position as, for example, for a 20-foot access opening, a special input switch 116 would be utilized.

The switch input 116 is connected directly to the central processing unit 74. The switch input 116 would be designed to cause the central processing unit to move the gate to the fully opened position, whereas other inputs would only cause the gate to be moved to the semi-opened position as, for example, the 10-foot position. It should also be understood that additional switch inputs could be provided to cause the gate to move to other selected distances as, for example, a pedestrian opening switch which would move the gate to e.g., 5 feet from the fully closed position.

When the previously described embodiment of the anti-tailgating mechanism is employed, an intermediate limit register 120 is used, as shown in FIG. 11. This intermediate limit register is used much the same way as the open limit register 94 and the close limit register 96. However, the intermediate limit register is more specifically designed to receive counts or pulses equivalent to an intermediate position opening of the gate, and as more fully hereinafter described in connection with the flow diagram of FIG. 14.

The logic flow diagram showing the steps involved in the first anti-tailgating mechanism is more fully illustrated in FIG. 14 of the drawings. When the intermediate switch input is used, an intermediate limit bit is set in the memory register and particularly, the intermediate limit register 120. This bit signifies that an input from the switch input 172 was received. As a result, an additional number of counts is added to the value stored in the close limit register 98. Typically, if the gate is to be opened only an intermediate distance of 12 feet upon actuation of the switch input 72, then 144 counts is added to the value stored in the close limit register 90. In this respect, it should be understood that either of the inputs 70 or 116 could be used for generating the intermediate position input and the opposite of those input switches would be used for opening the gate for its fully opened distance.

Each time that the gate is now opened, a determination will be made as to whether or not the open/close counter 92 has a value equal to the open limit register 94 and there will be a determination as to whether or not the intermediate limit bit is stored in the intermediate limit register 120. If so, the intermediate limit register 120 is used in place of the open limit register 94.

The flow diagram of FIG. 14 has been established for an intermediate opening of 12 feet. However, it should be understood that this is only exemplary and that any intermediate distance could be used.

The present invention also provides a second embodiment of the anti-tailgating mechanism and which utilizes the sensors 102 and 104 which are connected to the gate operator A. In all embodiments of the gate operator of the present invention, the operator is designed to detect a gate obstruction as, for example, the contacting of a vehicle by the gate. This would normally cause the gate to move to a fully opened position. For this purpose, the obstruction sensors or safety loop sensors, or so-called "obstruction sensors" 102 and 104 will also detect the presence of a vehicle to otherwise cause a gate to move back to the opened position.

In accordance with the present invention, the central processing unit 74 may be operated so as to stop the gate in its position at the time of detection of an obstruction and upon detection of that obstruction. Thus, if a gate is moving from the fully opened position, as shown in the dotted lines of FIG. 11, to the fully closed position, as shown in the solid lines of FIG. 11, the gate will be stopped in its position of movement but will not return to the fully opened position. In other words, the gate will just be stopped in a position upon detection of an obstruction. This will preclude the gate from remaining open over a time period to allow an unauthorized individual to attempt to enter through the access opening.

FIG. 15 illustrates those steps utilized in the second embodiment of the anti-tailgating mechanism. When using this embodiment of the anti-tailgating mechanism, a reverse/stop switch 122 is provided for connection to the central processing unit 74, as shown in FIG. 10. This switch allows the user to determine whether or not a reverse of the gate will take place or otherwise, a mere stopping of the gate will take place upon detection of an obstruction. Consequently, the first step in the flow diagram after the motor is energized to close the gate, is to determine if the reverse/stop switch is set, namely, is the input true. If the input is not true, then the switch is obviously not set so that the gate will normally reverse in operation. If the switch 122 has been actuated, then the gate will only close in accordance with the steps as shown in FIG. 15.

When the switch 122 is in the normal position for the gate to reverse, if the gate is closing and the safety loop detects an obstruction, that is, the safety loop is actuated, the gate will automatically reverse to the full opened position, as shown in accordance with the steps of FIG. 15. On the other hand, if the reverse/stop switch 122 has been actuated to stop the gate during a closing movement, and the safety loop is activated, the gate will automatically stop. There will be a delay waiting for the safety loop to deactivate, at which time the gate will continue to close. However, if another authorized gate open signal is received, the gate will immediately return from the position at which it stopped to the open position.

Thus, there has been illustrated and described a unique and novel gate operator which enables movement of a gate to a fixed end position without hard impact with a fixed structure at that end position. The present invention therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described the invention, what we desire to claim and secure by letters patent is:

1. A gate operator for moving a gate between two fixed end positions and one of which may constitute a gate opened end position and the other of which may constitute a gate closed end position and automatically compensating for external conditions which affect gate movement to minimize contact with a fixed structure at the end positions, said apparatus comprising:

a) means for driving a gate under power and measuring counts representative of a distance between a first fixed end position to a second and opposite fixed end position continuously during the gate movement and commencing with the starting movement of the gate; and b) control means for measuring a count representative of a movement distance on the next movement of the gate from the first fixed end position to the second fixed end position and automatically adding a control count to increase the driving movement and hence driving distance for still subsequent powered movements of the gate from the first fixed end position to the second fixed end position if the gate stopped short of the second fixed end position, said control means further measuring the counts representative of distance of movement for still subsequent movements from the first fixed end position to the second fixed end position and adding still additional control counts to increase driving movement and hence driving distance if the gate still stopped short of the second fixed end position said control means automatically subtracting counts to reduce driving movement and hence driving distance for each subsequent powered movement to the second fixed end position of the gate if the gate still contacted a fixed structure at the second end position, said control means also subtracting still additional counts to reduce driving movement and hence driving distance for still subsequent movements from the first fixed end position to the second fixed end position if the gate still contacted a fixed structure at the second fixed end position.

2. The gate operator of claim 1 further characterized in that memory means forms part of said control means and receives counts representative of fixed end position movement and control counts to increase or reduce driving movement.

3. The gate operator of claim 2 further characterized in that a counter means measures counts in movement of the gate toward the second end position and separate counts for movement of the gate toward the first end position and provides such counts to the memory means.

4. The gate operator of claim 3 further characterized in that switch means is associated with said control means to adjust the amount of control counts to add to or subtract from the counts representative of fixed end position movement.

5. The gate operator of claim 2 further characterized in that said memory means comprises an end register to store those counts which are the correct representation of fixed end position movement and a limit register to store the control count.

6. The gate operator of claim 2 further characterized in that said memory means comprises an open end register to store the count representative of gate movement to an open position, a closed end register to store the count representative of gate movement to a gate closed position, an open limit register to store an open control count for use in modifying the count representative of movement to the open position and a closed limit register to store a closed control count for use in modifying the count representative of the movement to the closed position.

7. The gate operator of claim 1 further characterized in that said control means stops the driving action which moves the gate from one end position to the other end position in advance of the end position to which the gate is moving by a coasting count in a subsequent movements of the gate, thereby allowing the gate to coast to the end position toward which it is moving when the driving action is stopped.

8. The gate operator of claim 7 further characterized in that said control means comprises error determining means for determining if the gate stopped its coasting movement at the end position toward which it was moving, said control means adjusting the coasting count by a control count if the gate did not stop at an end position so that on subsequent movement the gate will stop at the end position toward which it is moving without hard impact.

9. A gate operator for moving a gate between two fixed end positions which may constitute gate opened and gate closed positions while minimizing the possibility of hard impact with a fixed structure at the end position, said apparatus comprising:
 a) means for driving a gate under power and measuring a plurality of counts continuously during gate movement from one fixed end position to the other and which measured count constitutes a fixed end position count representative of a measured movement between the fixed end positions in one movement of the gate;
 b) control means for stopping the driving action which moves the gate from one end position toward the other end position in advance of the end position to which the gate is moving by a coasting count in a subsequent movement of the gate after driving action ceases, thereby allowing the gate to controllably coast to the end position toward which it is moving when the driving action is stopped; and
 c) error determining means associated with the control means for determining if the gate stopped its coasting movement at the end position toward which it was moving and on end each occasion when the gate is moving to that end position, said control means adjusting the coasting count by a control count and increasing the driving action if the gate stopped short of the end position toward which the gate was moving, and said control means decreasing the driving action if the gate engaged the fixed end position toward which it was moving with a hard impact, so that on subsequent movements the gate will stop at the end position toward which it is moving without hard impact and without stopping short of the fixed end position.

10. The gate operator of claim 9 further characterized in that the control means receives an error count between the position where the driving action is stopped and the position where the gate reaches a full rest position uses that error count to determine the precise movement of the gate on subsequent occasions.

11. The gate operator of claim 9 further characterized in that the control means subtracts the coasting count from the count representative of measured movement between fixed end positions and adds the error count in order to determine movement of the gate on subsequent occasions without hard impact at the fixed end position toward which the gate is moving.

12. The gate operator of the claim 9 further characterized in that a drive means is provided for driving the gate under power between the fixed end positions, and a separate detecting means is provided for measuring the counts representative of movement.

13. The gate operator of claim 12 further characterized in that the control means is operatively connected to the drive means to control the operation of the drive means for moving the gate between the fixed end positions.

14. The gate operator of claim 9 further characterized in that magnetically operable sensors are associated with the detecting means for sensing movement of a rotatable member to thereby generate the count representation of measured movement and to determine the coasting count and error count.

15. The gate operator of claim 14 further characterized in that the sensors are arranged so that the control means can determine the direction of movement of the gate through operation of the detecting means.

16. A gate operator for moving a gate between a gate opened position and a gate closed position and minimizing the possibility of impact with a fixed structure at either of such positions, said operator comprising:
 a) drive means for driving the gate between the gate opened position and the gate closed position;
 b) detecting means for detecting a measured count representative of gate movement of the gate between one of the opened or closed positions to the other of the opened or closed positions;
 c) memory means for storing the measured count representative of gate movement;
 d) control means for stopping the drive means which drives the gate to a coasting position in advance of a fully opened position or a fully closed position thereby allowing the gate to coast to the fully opened position or the fully closed position toward which the gate is moving without any driving power or braking power; and
 e) said detecting means further measuring an error count representative of movement of the gate between the coasting position and the fully closed position or the coasting position and the fully opened position and storing the error count in the memory means thereby causing the memory means to enable operation of the drive means to drive the gate toward the position to which the gate was moving for a greater distance representative of the error count and thereby decreasing the distance between the coasting position and that end position if the gate previously stopped short of the end position toward which it was moving, and also causing the memory means to enable the drive means to drive the gate toward the position to which the gate was moving for a lesser distance representative of the error count and thereby increasing the distance between the coasting position and that end position if the gate banged into the end position toward which the gate was previously moving, so that on subsequent movements the gate can move between the opened and closed positions without banging into a fixed structure at either of the positions.

17. The gate operator of claim 16 further characterized in that the control means subtracts a predetermined coasting count from the measured count representative of movement and adds the error count to obtain a precise count of movement between opened and closed positions without hard contact with a fixed structure.

18. The gate operator of claim 16 further characterized in that the detecting means comprises sensors associated with the operator for detecting the measured count and error count by measuring movement of a movable member associated with the operator as the member is moved.

19. The gate operator of claim 18 further characterized in that the sensors are magnetically operable sensors.

20. The gate operator of claim 18 further characterized in that the control means operatives in conjunction with the sensors to determine the direction of movement of the gate.

21. The gate operator of claim 16 further characterized in that cushion means is associated with the drive means to engage any fixed structure and thereby avoid a hard contact of the gate with a fixed structure.

22. A method of moving a gate between a gate opened position and a gate closed position and minimizing the possibility of impact with a fixed structure at either of such positions, said operator comprising:

a) driving the gate by a drive means between the gate opened position and the gate closed position;

b) detecting a measured count representative of movement of the gate between one of the opened or closed positions to the other of the opened or closed positions;

c) storing the measured count representative of gate movement;

d) driving the gate by the drive means on a subsequent occasion between the gate opened position and the gate closed position in the same direction and in relation to the measured count;

e) stopping the drive means which drives the gate at a coasting position in advance of a fully opened position or a fully closed position;

f) allowing the gate to coast to the fully opened position or the fully closed position;

g) measuring an error count representative of movement of the gate between the coasting position and the fully closed position or the fully opened position;

h) determining a desired drive count with the measured count and the error count for moving the gate on subsequent movements;

i) enabling operation of the drive means to drive the gate toward the position to which the gate was moving for a greater distance representative of the error count and thereby decreasing the distance between the coasting position and that end position if the gate stopped short of the end position toward which it was moving; and j) also causing the drive means to drive the gate toward the position to which the gate was moving for a lesser distance representative of the error count and thereby increasing the distance between the coasting position and that end position if the gate banged into the end position toward which the gate was previously moving, so that the gate moves between the opened and closed positions without banging into a fixed structure at either of the closed or opened positions.

23. The method of claim 22 further characterized in that the method subtracts a predetermined coasting count from the measured count representative of movement and adds the error count to obtain a precise count of movement between opened or closed positions without hard contact with a fixed structure.

24. The method of claim 23 further characterized in that the method comprises determining the direction of movement of the gate.

25. A gate operator for moving a gate between a gate closed position covering an access opening and a gate opened position and effectively measuring the distance therebetween through measurement of electrical pulses responsive to gate movement, said apparatus comprising:

a) motive means to drive the gate between the gate opened position and the gate closed position;

b) connecting means for connecting the motive means to the gate for causing powered movement of the gate between the gate opened position and the gate closed position;

c) a rotatable member operatively associated with the gate or the connecting means or the motive means and being moveable in response to movement of the gate;

d) coupling means operatively associated with the rotatable member and the motive means for causing a driving movement of the gate a measured distance between the gate opened position and the gate closed position; and e) magnetic sensor elements associated with the rotatable member for generating pulses representative of distance of movement of the gate, said magnetic elements comprising at least three magnetic elements of a first polarity in an arcuate array and at least one additional magnetic element of an opposite polarity in the arcuate array so that said control means can detect at least three elements of one polarity and another element of an opposite polarity in the array and thereby determine if an aberrant electrical pulse, having the effects of a magnetic element, was detected.

26. A gate operator for moving a gate between two fixed end positions which may constitute gate opened and gate closed positions over an access opening leading to a secured area, while minimizing the possibility of an unauthorized vehicle or individual entering the secured area when the gate is opened, said operator comprising:

a) means for driving a gate under power between a fixed end gate closed position to a fixed end gate opened position and from the gate opened position to the gate closed position during the gate movement and alternatively for driving the gate from the closed position to an intermediate position which is intermediate the two fixed end positions;

b) first manually actuable input means actuable by a user of the operator to operate the means for driving the gate to cause an automatic movement of the gate from the gate closed position to the gate opened position upon actuation of the first manually actuable input means;

c) second manually actuable input means actuable by a user of the operator to operate the means for driving to cause an automatic movement of the gate from a gate closed position for a lesser distance only to the intermediate position upon actuation of the second manually actuable input means; and d) control means operatively connected to the first input means and the second input means for determining a count representative of movement of the gate to the gate opened position if the first input means is actuated and automatically driving the gate for the required number of counts toward the opened position, said control means determining a count representative of movement of the gate to the intermediate position and automatically driving the gate for that number of counts to the intermediate position if the second input means is activated.

27. The gate operator of claim 26 further characterized in that counter means forms part of said control means for counting the number of counts the gate is moved.

28. The gate operator of claim 27 further characterized in that a counter means measures counts in movement of the gate toward end positions and controls the driving movement to preclude hard contact with a fixed structure at the end positions.

29. A gate operator for moving a gate between two fixed end positions which may constitute gate opened and gate closed positions and for automatically stopping movement of the gate in the event of detection of an obstruction between the opened and closed positions to eliminate contact with the obstruction and while also minimizing possibility of unauthorized entry, said operator comprising:
 a) means for driving a gate under power between fixed end positions during the gate movement; and
 b) an obstruction detection circuit for automatically stopping movement of the gate between the fixed end positions in the event of detection of an obstruction; and
 c) control means for automatically stopping driving movement of the gate upon detection of an obstruction at a position intermediate the fixed end positions when the gate is moving toward the gate closed position or the gate opened position, said control means also enabling a continued movement of the gate to the closed position from the intermediate position without returning to the opened position if the gate was moving to the closed position when detecting the obstruction almost immediately upon receipt of an authorized signal to thereby minimize the possibility of unauthorized entry, but allow authorized entry.

30. A gate operator for moving a gate between two fixed end positions which may constitute a gate opened end position and a gate closed end position and automatically compensating for external conditions which affect gate movement to generally consistently reach the end positions and to minimize contact with a fixed structure at the end positions, said apparatus comprising:
 a) driving means for driving a gate under power;
 b) measurement means for effectively measuring an amount of movement between a first fixed end position to a second and opposite fixed end position during the gate movement;
 c) memory means for recording the distance of movement when the gate is moved between the end positions to enable monitoring of the movement on each occasion when the gate is moved;
 d) control means operatively associated with the memory means for monitoring if the gate fully reached the second fixed end position or stopped short of the second fixed end position or contacted the second end position with an impact on each occasion when the gate is moved to the second end position so that movement of the gate is continuously monitored on each occasion when moved to that second fixed end position; and
 e) means associated with the control means for causing the driving means to drive the gate for a greater or lesser distance on the next movement of the gate to the second fixed end position and automatically increasing the driving movement and hence driving distance if the gate stopped short of the second fixed end position so that on subsequent movements the gate will reach the second end position and also without hard impact thereat, said last named means reducing driving movement and hence driving distance for powered movement to the second fixed end position of the gate if the gate still contacted a fixed structure at the second fixed end position so that on subsequent movements the gate will reach the second end position without any hard impact, such that the gate operator determines where a gate stops on each movement to a closed position and continuously adjusts that movement to assure the gate reaches the second end position with complete closing and without hard impact at the second fixed end position.

31. The gate operator of claim 30 further characterized in that the control means monitors movement of the gate to the first fixed end position in the same manner as with the second end position, and the means associated with the control means drives the driving means to the gate to the first fixed end position as with the second fixed end position and on each occasion when the gate moves to the first fixed end position.

32. The gate operator of claim 31 further characterized in that a counter means measures counts representation of movement of the gate toward the second fixed end position and movement of the gate toward the first fixed end position and provides such counts to a memory means.

33. The gate operator of claim 32 further characterized in that manually operable switch means is associated with said control means to adjust control counts to add to or subtract from the counts representative of fixed end position movement.

34. The gate operator of claim 32 further characterized in that said memory means comprises an open end register to store a count representative of gate movement to an open position, a closed end register to store a count representative of gate movement to a gate closed position, an open limit register to store an open control count for use in modifying the count representative of movement to the open position and a closed limit register to store a closed control count for use in modifying the count representative of the movement to the closed position.

35. The gate operator of claim 31 further characterized in that said control means stops the driving action which moves the gate from one end position to the other end position in advance of the end position to which the gate is moving by a coasting count in subsequent movements of the gate, thereby allowing the gate to coast to the end position toward which it is moving when the driving action is stopped, and where the coasting count is monitored on each movement of the gate and adjusted if required.

36. A method for moving a gate between two fixed end positions which may constitute a gate opened end position and a gate closed end position and automatically compensating for external conditions which effect gate movement to minimize contact with a fixed structure at the end positions, said method comprising:
 a) driving a gate under power;
 b) effectively measuring the amount of movement of the gate from a first end position to a second end position opposite the first end position during the gate movement;
 c) monitoring movement of the gate to determine if the gate fully reached the second end position or was short of the second end position or if the gate contacted the second end position with an impact;

d) continuing said monitoring on each subsequent movement of the gate when the gate is moved to the second end position so that the gate is continuously monitored during all subsequent movements to that second end position;

e) causing the driving means to drive the gate a greater distance on the next movement of the gate to the second end position if the gate stopped short of the second end position so that on subsequent movements to the second end position the gate will fully reach the second end position; and f) reducing the driving movement, and hence the driving distance, for powered movement of the gate to the second end position of the gate if the gate still contacted a fixed structure at the second end position so that on subsequent movements of the gate to the second end position the gate will reach the second end position without any hard impact at that second end position, whereby the method determines where a gate stopped on each movement to a closed position and continuously adjusts that movement to assure a complete closing at the end position and without hard impact at that end position.

37. A gate operator for moving a gate between two fixed end positions and one of which may constitute a gate opened end position and the other of which may constitute a gate closed end position and automatically compensating for external conditions which affect gate movement to minimize contact with a fixed structure at the end positions, said apparatus comprising:

a) means for driving a gate under power and measuring counts representative of a distance between a first fixed end position to a second and opposite fixed end position continuously during the gate movement and commencing with the starting movement of the gate;

b) control means for measuring a count representative of a movement distance on the next movement of the gate from the first fixed end position to the second fixed end position and automatically adding a control count to increase the driving movement and hence driving distance for still subsequent powered movements of the gate if the gate stopped short of the second fixed end position, said control means subtracting counts to reduce driving movement and hence driving distance for each subsequent powered movement to the second end position of the gate if the gate still contacted a fixed structure at the second end position; and c) memory means for receiving the counts representative of movement between the first fixed end position and second fixed end position and cooperating with the control means to automatically add control counts if the gate stopped short of the second fixed end position and automatically subtracting counts if the gate contacted a fixed structure at the second fixed end position.

38. The gate operator of claim 37 further characterized in that a counter means measures counts in movement of the gate toward the second end position and movement of the gate toward the first end position and provides such counts to the memory means.

39. The gate operator of claim 38 further characterized in that switch means is associated with said control means to adjust the amount of control counts to add to or subtract from the counts representative of fixed end position movement.

40. The gate operator of claim 37 further characterized in that said memory means comprises an end register to store the correct representative of fixed end position movement count and a limit register to store the control count.

41. The gate operator of claim 37 further characterized in that said memory means comprises an open end register to store the count representative of gate movement to an open position, a closed end register to store the count representative of gate movement to a gate closed position, an open limit register to store an open control count for use in modifying the count representative of movement to the open position and a close limit register to store a closed control count for use in modifying the count representative of the movement to the closed position.

42. The gate operator of claim 37 further characterized in that said control means stops the driving action which moves the gate from one end position to the other end position in advance of the end position to which the gate is moving by a coasting count in a subsequent movements of the gate, thereby allowing the gate to coast to the end position toward which it is moving when the driving action is stopped.

43. The gate operator of claim 37 further characterized in that said control means comprises error determining means for determining if the gate stopped its coasting movement at the end position toward which it was moving, said control means adjusting the coasting count by a control count if the gate did not stop at an end position so that on subsequent movement the gate will stop at the end position toward which it is moving without hard impact.

* * * * *